(12) United States Patent
Meixner et al.

(10) Patent No.: US 11,138,013 B2
(45) Date of Patent: Oct. 5, 2021

(54) ENERGY EFFICIENT PROCESSOR CORE ARCHITECTURE FOR IMAGE PROCESSOR

(71) Applicant: Google LLC, Mountain View, CA (US)

(72) Inventors: Albert Meixner, Mountain View, CA (US); Jason Rupert Redgrave, Mountain View, CA (US); Ofer Shacham, Los Altos, CA (US); Daniel Frederic Finchelstein, Redwood City, CA (US); Qiuling Zhu, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/001,097

(22) Filed: Aug. 24, 2020

(65) Prior Publication Data

US 2021/0004232 A1 Jan. 7, 2021

Related U.S. Application Data

(63) Continuation of application No. 16/368,288, filed on Mar. 28, 2019, now Pat. No. 10,754,654, which is a (Continued)

(51) Int. Cl.
*G06F 9/38* (2018.01)
*G06T 1/20* (2006.01)
(Continued)

(52) U.S. Cl.
CPC .......... *G06F 9/3802* (2013.01); *G06F 9/3004* (2013.01); *G06F 9/30043* (2013.01);
(Continued)

(58) Field of Classification Search
None
See application file for complete search history.

(56) References Cited

U.S. PATENT DOCUMENTS 4,445,177 A 4/1984 Bratt et al.
4,935,894 A 6/1990 Ternes et al.
(Continued)

FOREIGN PATENT DOCUMENTS

EP 0293701 12/1988
JP S63-316168 A 12/1988
(Continued)

OTHER PUBLICATIONS

Brunie, N. etal., Simultaneous Branch and Warp Interweaving for Sustained GPU Performance, 2012, IEEE, pp. 49-60. (Year: 2012).*
(Continued)

*Primary Examiner* — Eric Coleman
(74) *Attorney, Agent, or Firm* — Fish & Richardson P.C.

(57) ABSTRACT

An apparatus that includes a program controller to fetch and issue instructions is described. The apparatus includes an execution lane having at least one execution unit to execute the instructions. The execution lane is part of an execution lane array that is coupled to a two dimensional shift register array structure, wherein, execution lane s of the execution lane array are located at respective array locations and are coupled to dedicated registers at same respective array locations in the two-dimensional shift register array.

20 Claims, 31 Drawing Sheets

Related U.S. Application Data continuation of application No. 15/595,632, filed on May 15, 2017, now Pat. No. 10,275,253, which is a continuation of application No. 14/694,815, filed on Apr. 23, 2015, now Pat. No. 9,772,852.

(51) Int. Cl.
   *G06F 9/30* (2018.01)
   *G06F 15/80* (2006.01)
   *H04N 3/14* (2006.01)

(52) U.S. Cl.
   CPC ........ *G06F 9/30134* (2013.01); *G06F 9/3836* (2013.01); *G06F 9/3851* (2013.01); *G06F 9/3871* (2013.01); *G06F 9/3885* (2013.01); *G06F 9/3887* (2013.01); *G06F 15/8023* (2013.01); *G06T 1/20* (2013.01); *H04N 3/1575* (2013.01); *G06F 9/38* (2013.01); *H04N 3/14* (2013.01)

(56) References Cited

U.S. PATENT DOCUMENTS

| | | | |
|---|---|---|---|
| 5,253,308 A | 10/1993 | Johnson | |
| 5,446,479 A | 8/1995 | Thompson | |
| 5,612,693 A | 3/1997 | Craft et al. | |
| 5,751,864 A | 5/1998 | Moriwake et al. | |
| 5,892,962 A | 4/1999 | Cloutier | |
| 6,049,859 A | 4/2000 | Gliese | |
| 6,366,289 B1 | 4/2002 | Johns | |
| 6,587,158 B1 | 7/2003 | Dale et al. | |
| 6,587,913 B2 | 7/2003 | Cannpanale | |
| 6,728,862 B1 | 4/2004 | Wilson | |
| 6,745,319 B1 | 6/2004 | Balmer et al. | |
| 6,970,196 B1 | 11/2005 | Ishikawa | |
| 7,010,177 B1 | 3/2006 | Mattison | |
| 7,142,215 B1 | 11/2006 | Papakipos | |
| 7,167,890 B2 | 1/2007 | Lin et al. | |
| 7,200,287 B2 | 4/2007 | Fukuda et al. | |
| 7,286,717 B2 | 10/2007 | Nomizu | |
| 7,583,851 B2 | 9/2009 | Kudo et al. | |
| 7,734,003 B2 | 6/2010 | Chien | |
| 7,941,634 B2 | 5/2011 | Georgi et al. | |
| 8,031,160 B2 | 10/2011 | Chen | |
| 8,156,284 B2 | 4/2012 | Vorbach et al. | |
| 8,321,849 B2 | 11/2012 | Nickolls et al. | |
| 8,436,857 B2 | 5/2013 | Twilleager | |
| 8,508,612 B2 | 8/2013 | Cote et al. | |
| 8,543,843 B1 | 9/2013 | Cheng et al. | |
| 8,650,384 B2 | 2/2014 | Lee et al. | |
| 8,749,667 B2 | 6/2014 | Noraz et al. | |
| 8,786,614 B2 | 7/2014 | Curry et al. | |
| 8,797,323 B2 | 8/2014 | Salvi et al. | |
| 8,823,736 B2 | 9/2014 | Barringer Rasmus et al. | |
| 8,970,884 B2 | 3/2015 | Tsuji et al. | |
| 8,976,195 B1 | 3/2015 | Lindholm et al. | |
| 9,299,181 B2 | 3/2016 | Goel | |
| 9,378,181 B2 | 6/2016 | Krig | |
| 9,547,530 B2* | 1/2017 | Mansell ................ G06F 9/4856 |
| 9,749,548 B2 | 8/2017 | Zhu | |
| 9,772,852 B2 | 9/2017 | Meixner et al. | |
| 9,851,977 B2* | 12/2017 | Brunie ................. G06F 9/3887 |
| 10,120,717 B2* | 11/2018 | Barrere ................ G06F 9/5011 |
| 10,275,253 B2 | 4/2019 | Meixner et al. | |
| 2003/0005365 A1 | 1/2003 | Wilson | |
| 2005/0270412 A1 | 12/2005 | Kaman et al. | |
| 2006/0044576 A1 | 3/2006 | Tabata et al. | |
| 2007/0047828 A1 | 3/2007 | Ishii et al. | |
| 2007/0080969 A1 | 4/2007 | Yamaura | |
| 2007/0156729 A1 | 7/2007 | Shavlor | |
| 2008/0111823 A1 | 5/2008 | Fan et al. | |
| 2008/0244222 A1 | 10/2008 | Supalov et al. | |
| 2008/0266302 A1 | 10/2008 | Andre et al. | |
| 2009/0002390 A1 | 1/2009 | Kuna | |
| 2009/0228677 A1 | 9/2009 | Liege | |
| 2009/0300621 A1 | 12/2009 | Mantor et al. | |
| 2009/0317009 A1 | 12/2009 | Ren | |
| 2010/0122105 A1 | 5/2010 | Arslan et al. | |
| 2010/0182042 A1 | 7/2010 | Law et al. | |
| 2010/0188538 A1 | 7/2010 | Sugawa et al. | |
| 2011/0055495 A1 | 3/2011 | Wolford et al. | |
| 2011/0087867 A1 | 4/2011 | Jacobson et al. | |
| 2011/0125768 A1 | 5/2011 | Shibao | |
| 2011/0153925 A1 | 6/2011 | Bains et al. | |
| 2012/0320070 A1 | 12/2012 | Arvo | |
| 2013/0027416 A1 | 1/2013 | Vaithianathan et al. | |
| 2013/0202051 A1 | 8/2013 | Zhou | |
| 2013/0232322 A1* | 9/2013 | Fetterman ............ G06F 9/3887 |
| | | | 712/225 |
| 2013/0243329 A1 | 9/2013 | Oro Garcia et al. | |
| 2013/0314428 A1 | 11/2013 | Chen et al. | |
| 2013/0318544 A1 | 11/2013 | Kuroda et al. | |
| 2014/0019486 A1 | 1/2014 | Majumdar | |
| 2014/0028876 A1 | 1/2014 | Mills | |
| 2014/0136816 A1 | 5/2014 | Kriq | |
| 2014/0164737 A1 | 6/2014 | Collange | |
| 2014/0282611 A1 | 9/2014 | Campbell et al. | |
| 2014/0351529 A1 | 11/2014 | Wells | |
| 2015/0106596 A1 | 4/2015 | Vorbach et al. | |
| 2015/0143083 A1 | 5/2015 | Le | |
| 2016/0202989 A1* | 7/2016 | Eisen ................... G06F 9/3851 |
| | | | 712/215 |
| 2016/0210720 A1 | 7/2016 | Taylor et al. | |
| 2016/0219225 A1 | 7/2016 | Zhu et al. | |
| 2017/0024847 A1 | 1/2017 | Engh-Halstvedt | |
| 2017/0249153 A1 | 8/2017 | Meixner et al. | |
| 2019/0220282 A1 | 7/2019 | Meixner | |

FOREIGN PATENT DOCUMENTS

| | | |
|---|---|---|
| JP | 2001-084229 | 3/2001 |
| JP | 2009-123074 A | 6/2009 |
| JP | 2010-063173 A | 3/2010 |
| JP | 2013090070 | 5/2013 |
| WO | WO 9409595 | 4/1994 |
| WO | WO 2007/071883 | 6/2007 |

OTHER PUBLICATIONS

Fung, W.W.L. etal., Energy Efficient GPU Transactional Memory via Space-Time Optimizations, 2013, ACM. pp. 408-420. (Year: 2013).*

Narasiman, V., etal., Improving GPU Performance via Large Warps and Two-Level Warp Scheduling, 2011, ACM pp. 308-317. (Year: 2011).*

"ChimeraTM: The NVIDIA Computational Photography Architecture" Whitepaper, NVIDIA Corporation 2013, 15 pages.

"Multioutput Scaler Reference Design" Altera Corporation, Application Note AN-648-1.0, Aug. 2012, 18 pages.

Adams, et al. "The Frankencamera: An Experimental Platform for Computational Photography", ACM Transactions on Graphics, vol. 29, No. 4, Article 29, Publication Jul. 2010, 12 pages.

Adobe Systems, Adobe Photoshop CS6, released and on sale in May 2012, pp. 1-2.

Ahn, et al., "Evaluating the Image Stream Architecture." In ACM SIGARCH Computer Architecture News, vol. 32, No. 2, IEEE Computer Society, Jun. 2004, 14 pages.

Arasan "Silicon Hive Announces New Image Signal Processor", Eindhoven, the Netherlands, May 16, 2006, http://www.design-reuse.com/news/13362/silicon-hive-image-signal-processor.html, 3 pages.

Balfour, et al., "An Energy-Efficient Processor Architecture For Embedded Systems" IEEE Computer Architecture Letters 7, No. 1 p. 29-32, May 2008.

Barry, et al., "Always-On Vision Processing Unit For Mobile Applications", IEEE Micro, Mar./Apr. 2015, pp. 56-66.

Bolotoff, Paul V., "Alpha—The History in Facts and Comments" http://alasir.com/articles/a;pha_history/alpha_21164_21164pc. html, Last modification date Apr. 22, 2007,5 pages.

(56) References Cited

OTHER PUBLICATIONS

Bushey, et al., "Flexible Function-Level Acceleration of Embedded Vision Applications Using the Pipelined Vision Processor." In Signals, Systems and Computers, 2013 Asilomar Conference, pp. 1447-1452, IEEE, 2013.
Cardells-Tormo et al., "Area-efficient 2-D Shift-variant Convolvers for FPGA-based Digital Image Processing," IEEE Workshop on Signal Processing Systems Design and Implementation, Nov. 2, 2005, 5 pages. Levinthal, "Parallel Computers for Graphics Applications", ACM, 1987, pp. 193-198.
CEVA-MM3101: An Imaging-Optimized DSP Core Swings for an Embedded Vision Home Run, http://www.bdti.com/insideDSP.2012/01/24/CEVA, Jan. 19, 2012, 3 pages.
Chao et al., "Pyramid Architecture for 3840 x 2160 Quad Full High Definition 30 Frames/s Video Acguisition", IEEE Transactions on Circuits and Systems for Video Technology, Nov. 1, 2010, 1 0 pages.
Chen et al., "CRISP: Coarse-Grained Reconfigurable Image Stream Processor for Digital Still Cameras and Camcorders," IEEE Transactions on Circuits and Systems for Video Technology, Sep. 2008, 14 pages.
Chen, et al., "DaDianNao: A Machine-Learning Supercomputer." 47'" Annual IEEE/ACM International Symposium, pp. 609-622, IEEE, Dec. 2014.
Chenyun, et al., "A Paradigm Shift in Local Interconnect Technology Design in the Era of Nanoscale Multigate and Gate-All-Around Devices," IEEE Electron Device Letters, vol. 36, No. 3, pp. 274-26, Mar. 2015.
Clearspeed Whitepaper: CSX Processor Architecture, www.clears12eed.com, 2007, 16 pages.
CN Office Action in Chinese Appln. No. 201680019801.X, dated Feb. 6, 2020, 20 pages (with English translation).
Codrescu, et al., "Hexagon DSP: An Architecture Optimized For Mobile Multimedia and Communications." IEEE Micro vol. 34, Issue 2, pp. 34-43, Mar. 2014.
Dally, William J., "Computer architecture is all about interconnect." Proceedings of sm International Symposium High-Perf, Comp, Architecture, Feb. 2002, 11 pages.
de Dinechin, et al., "A Clustered Manycore Processor Architecture for Embedded and Accelerated Applications." In High Performance Extreme Computing Conference (HPEC), IEEE, pp. 1-6, Sep. 2013.
DeVito, et al., "Terra: A Multi-Stage Language for High-Performance Computing", PLDl'13, Jun. 16-22, 2013, Seattle, Washington, 11 pages.
DeVito, et al.,"First-class Runtime Generation of High-Performance Types using Exotypes", PLDl'14, Jun. 9-11, ACM, 12 pages, 2014.
Dykes et al., "Communication and Computation Patterns of Large Scale Image Convolutions on Parallel Architectures," Parallel Processing Symposium, Jan. 1, 1994, 6 pages.
Eichenberger, et al., "Optimizing Compiler for the Cell Processor" PACT, Tuesday, Sep. 20, 2005, Part 1, pp. 1-16.
Eichenberger, et al., "Optimizing Compiler for the Cell Processor" PACT, Tuesday, Sep. 20, 2005, Part 2, pp. 17-32.
EyeQ2TM, "Vision System On A Chip", Mobileye, Sep. 2007, 4 pages.
Farabet, et al., "Hardware Accelerated Convolutional Neural Networks For Synthetic Vision Systems." Proceedings of 2010 IEEE International Symposium, pp. 257-260, Jun. 2010.
Farabet, et al., "Neuflow: A Runtime Reconfigurable Dataflow Processor For Vision." IEEE Computer Society Conference, pp. 109-116, Jun. 2011.
Ferreira et al. More Efficient Terrain Viewshed Computation on Massive Datasers Using External Memory, 2012.
Galal, et al., "FPU Generator for Design Space Exploration." 21 5 ' IEEE Symposium on Computer Arithmetic (ARITH), Apr. 2013, 10 pages.
Gentile, et al., "Image Processing Chain for Digital Still Cameras Based on SIMPil Architecture." ICCP International Conference Workshops, pp. 215-222, IEEE, Jun. 2005.
Goldstein, et al., "PipeRench: A Coprocessor for Streaming Multimedia Acceleration", Carnegie Mellow University, Research Showcase @CMU, Appears in the 26th Annual International Symposium on Computer Architecture, May 1999, Atlanta, Georgia, 14 paqes.
Gupta, et al., "A VLSI Architecture for Updating Raster-Scan Displays", Computer Graphics, vol. 15, No. 3, Aug. 1981, pp. 71-78.
Hameed, et al., "Understanding Sources of Inefficiency in General-Purpose Chips." ACM SIGARCH Computer Architecture News, vol. 38, No. 3, pp. 37-47, 2010.
Hanrahan, Pat, "Domain-Specific Languages for Heterogeneous GPU Computing", NVIDIA Technology Conference, Oct. 2, 2009, 30 pages.
Hegarty, et al., "Darkroom: Compiling High-Level Image Processing Code into Hardware Pipelines", Proceedings of ACM SIGGRAPH, Jul. 2014, 11 pages.
Henretty, et al., "A Stencil Compiler for Short-Vector SIMD Architectures", ACM, ICS'13, Jun. 10-14, 2013, Eugene, Oregon, pp. 13-24.
Horowitz, Mark, "Computing's Energy Problem: (and what we can do about it)", IEEE, International Solid-State Circuits Conference 2014, 46 pages.
International Preliminary Report on Patentability issued in International Application No. PCT/US2016/026789, dated Nov. 2, 2017, 8 pages.
Kapasi, et al. "The Imagine Stream Processor", IEEE, International Conference On Computer Design: VLSI in Computers and Processors (ICCD'02), 2002, 17 pages.
Khailany, Brucek K. et al. A Programmable 512 GOPS Stream Processor for Signal, Image and Video Processing, 2008, IEEE Journal of Solid-State Circuits, 43(1) pp. 202-213.
Khailany, et al., "A Programmable 512 GOPS Stream Processor for Signal, Image, and Video Processing", IEEE Journal of Solid-State Circuits, vol. 43, No. 1, pp. 202-213, Jan. 2008.
Khawam, et al., "The Reconfigurable Instruction Cell Array", IEEE Transactions on Very Large Scale Integration (VLSI) Systems, vol. 16, No. 1, Jan. 2008, pp. 75-85.
Khronos, SPIR 2.0 "Provisional Specification to Enable Compiler Innovation on Diverse Parallel Architectures", Aug. 11, 2014, 2 pages.
Levinthal, et al., "Chap-A SIMD Graphics Processor", Computer Graphics, vol. 18, No. 3, Jul. 1984, pp. 77-82.
M.J. Duff, "CLIP 4: A Large Scale Integrated Circuit Array Parallel Processor," Proc. IEEE lnt'I Joint Conf. Pattern Recognition, . . . Jan. 2004, pp. 728-733.
Mandal, et al., "An Embedded Vision Engine (EVE) for Automotive Vision Processing." In Circuits and Systems (ISCAS), 2014 IEEE Symposium, pp. 49-52, IEEE, 2014.
Mcintosh-Smith, "A Next-Generation Many-Core Processor With Reliability, Fault Tolerance and Adaptive Power Management Features Optimized For Embedded and High Performance Computing Applications" in Proceedings of the High Performance Embedded ComputinQ Conference (HPEC) 2008, paQes 1-2, 5.
Mody, et al., "High Performance and Flexible Imaging Sub-System." In Advances in Computing, Communications and Informatics (ICACCI), 2014 International Conference, pp. 545-548. IEEE, 2014.
Molnar, et al., "PixelFlow: High-Speed Rendering Using Image Composition" proceedings of Siggraph 92, Computer Graphics, 26, Jul. 2, 1992, 10 pages.
Moloney, David, "1 TOPS/W Software Programmable Media Processor." Hot Chips 23 Symposium (HCS), IEEE, Aug. 2011, 24 pages.
Moloney, et al., "Myriad 2: Eye Of The Computational Vision Storm", Hot Chips 26 Symposium (HCS), IEEE, Aug. 2014, 18 pages.
MPPA—MANYCORE, Product Family Overview http://www.kalray.eu/IMG/pdf/FLYER_MPPS_MANYCORE-4.orf, Feb. 2014, 2 pages.
Nightingale, Edmund B., et al., "Helios: Heterogeneous Multiprocessing with Satellite Kernels," SOSP '09, Oct. 11-14, 2009, Big Sky, Montana, U.S.A., (Oct. 11, 2009), 14 pages.
NVIDIA-NVIDIA's Next Generation CUDA™ Compute Architecture: Kepler™, GK110/210, 2014, 23 pages https://internationa.download.nvidia.com/pdf/kepler/NVIDIA-KeplerGK110-GK210-Architecture-Whitepaper.odf.

(56) References Cited

OTHER PUBLICATIONS

NVIDIA Tegra K1—A New Era in Mobile Computing—Whitepapers—Jan. 2014, 26 pages.
NVIDIA Tegra X1—NVIDIA's New Mobile Superchip—Whitepapers—Jan. 2015, 41 pages.
NVIDIA, "PTX:Parallel Thread Execution ISA Version 1.4", Aug. 23, 2010, 135 pages.
Olofsson, et al., "A 25 GFLOPS/Watt Software Programmable Floating Point Accelerator" High Performance Embedded Computing Conference, 2010, 2 pages.
Oosterhout, Optimized Pixel Template Image Correlator, Master Thesis, Aug. 19, 1992, 74 pages.
Parker, Richard, "Embedding Computer Vision in Electronic Devices: How New Hardware and Software Choices Have Changed the Designer's Approach", Future Technology Magazine, pp. 22-23, Feb. 2013.
PCT/US2016/026789, International Search Report and Written Opinion, dated Jul. 5, 2016, 13 pages.
Pelc, Oscar, "Multimedia Support in the i.MX31 and i.MX31 L Applications Processors", Freescale Semiconductor, Inc., Feb. 2006, http//cache.freescale.com/files/32bit/doc/white/IMX31MULTIWP.odf, 12 pages.
Pham, et al., "NeuFlow: Dataflow Vision Processing System-On-A-Chip." IEEE 55m International Midwest Symposium, Aug. 2012, 4 pages.
Qadeer, et al., "Convolution Engine: Balancing Efficiency & Flexibility in Specialized Computing", ISCA '13 Tel-Aviv, Israel, ACM 2013, pp. 24-35.
Ragan-Kelley et al., "Halide: A Language and Compiler for Optimizing Parallelism, Locality,and Recomputation in Image Processing Pipelines", Jun. 16, 2013, 12 pages.
S.F. Reddaway,"DAP—A Distributed Processor Array", ISCA '73 Proceedings of the First Ann. Symposium On Computer Architecture, pp. 61-65, 1973.
SCP2200: Image Cognition Processors Family [Product Brief], https://www.element14.com/community/docs/DOC-50990, Oct. 26, 2012, 2 pages.
SCP2200: Image Cognition Processors, https://www.element14.com/community/docs/DOC-50984/I/scp2200-image-cognition-processors, Oct. 25, 2012, 2 pages.
Sedaghati et al., "StVEC: A Vector Instruction Extension for High Performance Stencil Computation", Parallel Architectures and Compilation Techniques, Oct. 10, 2011, 12 pages.
SemiWiki.com—New CEVA-ZM4 Vision IP Does Point clouds and and More: Published Feb. 27, 2015 https://www.semiwiki.com/forum/content/4354-new0ceva-xm4-vision-ip-does-point-clouds-more-html.
Shacham, et al. "Smart Memories Polymorphic Chip Multiprocessor", Proceedings of the 46th Design Automation Conference (OAC), San Francisco, CA, Jul. 2009.
Shacham, et al., "Rethinking Digital Design: Why Design Must Change", IEEE micro Magazine, Nov./Dec. 2010.
Shacham, Ofer, "Chip Multiprocessor Generator: Automatic Generation Of Custom and Heterogeneous Complete Platforms" Dissertation—Stanford University, May 2011, 190 paQes. Part 1.
Shacham, Ofer, "Chip Multiprocessor Generator: Automatic Generation Of Custom and Heterogeneous Complete Platforms" Dissertation—Stanford University, May 2011, 190 paQes. Part 2.
Silicon Hive: "Silicon System Design of Media and Communications Applications", Jun. 13, 2007, 22 pages.
Spampinato, et al., "A Basic Linear Algebra Compiler", ACM, CG0'14, Feb. 15-19, 2014, Orlando Fl, pp. 23-32.
SPIR, The SPIR Specification, Version 2.0, Revision Date Jun. 5, 2014, 40 pages.
Stein, et al., "A Computer Vision System On A Chip: A Case Study From The Automotive Domain," IEEE Computer Society Conference, p. 130, 2005.
Stojanov, et al., "Abstracting Vector Architectures in Library Generators: Case Study Convolution Filters", ARRAY 14, ACM, Jun. 11, 2014, UK, pp. 14-19.
Stream Processors, Inc. Announces Storm-1 Family of Data-Parallel Digital Signal Processors, ISSCC 2007, Feb. 12, 2007, 3 pages. http://www.businesswire.com/news/home/20070212005230/en/Stream-Processors-Announces- Storm-2-Family-Data_parallel-Digital.
Stream Processors, Inc., Company History—Foundational Work in Stream Processing initiated in 1995, http://wn.wikipedia.corg/wiki/Stram_Processors,_inc 5 pages.
Tanabe, et al., "Visconti: multi-VLIW image Recognition Processor Based on Configurable Processor [obstacle detection applications]", Custom Integrated Circuits Conference, IEEE, 2003, http://ieeexpolore.ieee.org/document/1249387/?a number=1249387&tag=1.
Van der Wal, et al., "The Acadia Vision Processor", IEEE proceedings of International Workshop on Computer Applications for Machine Perception, Sep. 2000, http://citeseerx.ist.psu.edu/viewdoc/download?doi=10.1.1.32.3830$rep1&type=pdf, 10 pages.
Wahib et al., "Scalable Kernel Fusion for Memory-Bound GPU Applications," SC14: International Conference for High Performance Computing, Networking, Storage and Analysis, Nov. 16, 2014, 12 pages.
Yadav et al. "A Fast and Area Efficient 2-D Convolver For Real Time Image Processing," 2008.
Yu et al., "Optimizing Data Intensive Window-based Image Processing on reconfigurable Hardware Boards," Proc. IEEE Workshop on Signal Processing System Design and Implementation, Nov. 2, 2005, 6 pages.
Zhou, Minhua, et al., "Parallel Tools in HEVC for High-Throughput Processing," Applications of Digital Processing, XXXV, Proc. of SPI, vol. 8499, (Jan. 1, 2012), pp. 1-13.
JP Office Action in Japanese Application No. 2019-197437, dated Jan. 12, 2021, 6 pages (with English translation).
IN Office Action in Indian Application No. 201747034409, dated Sep. 16, 2020, 6 pages (with English translation).
EP Office Action in European Application No. 16721988.0, dated Nov. 13, 2020, 6 pages.

* cited by examiner

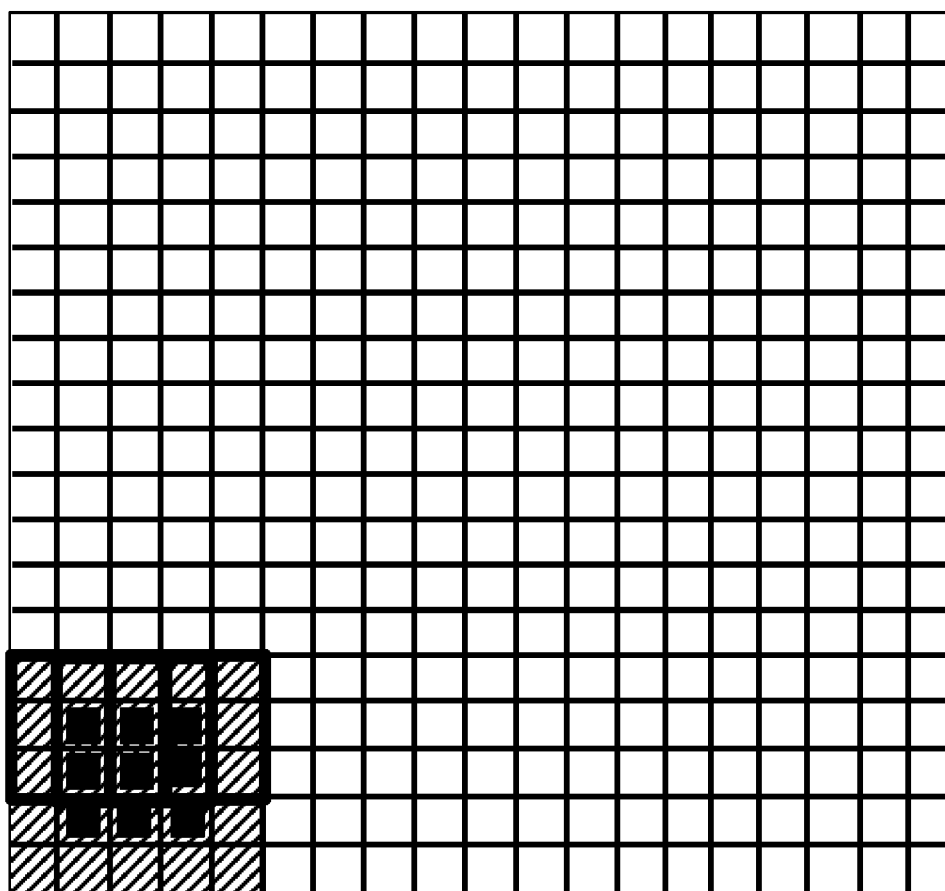

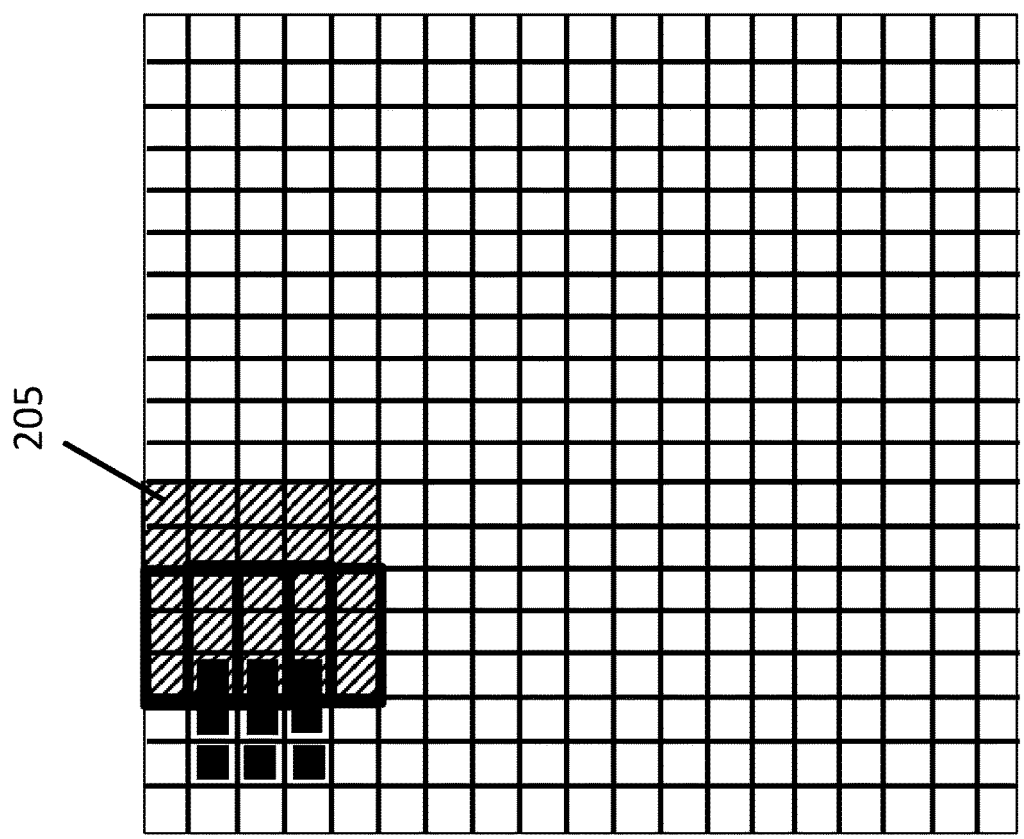

| Scalar instruction 351 | 2D ALU Instruction 352 | Memory Access Instruction 353 | Immediate Operand 354 |

Fig. 3b

ENERGY EFFICIENT PROCESSOR CORE ARCHITECTURE FOR IMAGE PROCESSOR

CROSS REFERENCE TO RELATED APPLICATIONS

This application is a continuation of U.S. patent application Ser. No. 16/368,288, filed Mar. 28, 2019, which is a continuation of U.S. patent application Ser. No. 15/595,632, filed May 15, 2017, which is a continuation of U.S. patent application Ser. No. 14/694,815, filed on Apr. 23, 2015, the entire contents of which are hereby incorporated by reference.

FIELD OF INVENTION

The field of invention pertains generally to image processing, and, more specifically, to an energy efficient processor core architecture for an image processor.

BACKGROUND

Image processing typically involves the processing of pixel values that are organized into an array. Here, a spatially organized two dimensional array captures the two dimensional nature of images (additional dimensions may include time (e.g., a sequence of two dimensional images) and data type (e.g., colors). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hardwired circuitry to much larger blocks of data. The use of larger (as opposed to finer grained) blocks of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

An apparatus is described. The apparatus includes a program controller to fetch and issue instructions. The apparatus includes an execution lane having at least one execution unit to execute the instructions. The execution lane is part of an execution lane array that is coupled to a two dimensional shift register array structure, wherein, execution lane s of the execution lane array are located at respective array locations and are coupled to dedicated registers at same respective array locations in the two-dimensional shift register array.

LIST OF FIGURES

The following description and accompanying drawings are used to illustrate embodiments of the invention. In the drawings:

FIGS. 2a, 2b, 2c, 2d and 2e depict the parsing of image data into a line group, the parsing of a line group into a sheet and the operation performed on a sheet with overlapping stencils;

FIG. 3b shows an embodiment of a instruction word of the stencil processor;

Figure 9:
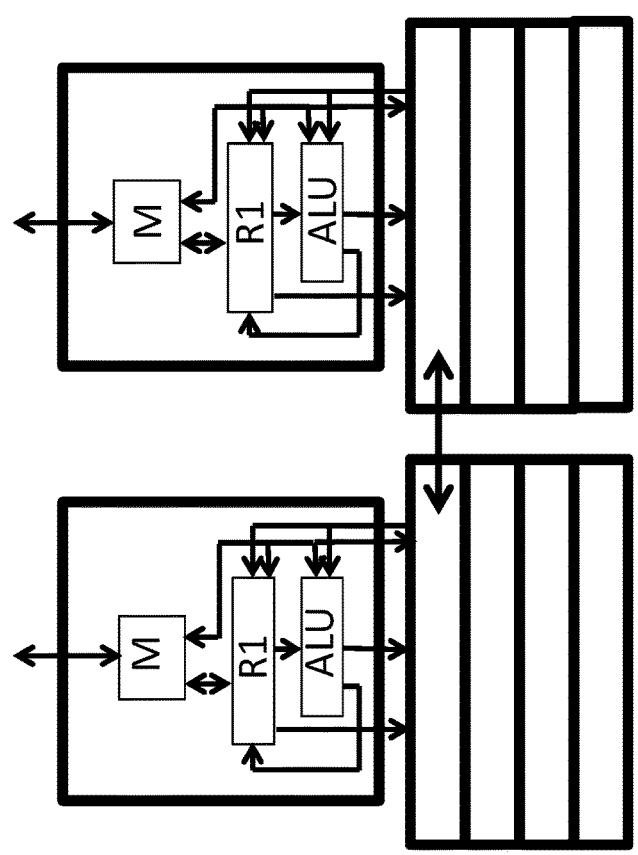
Figure 9:
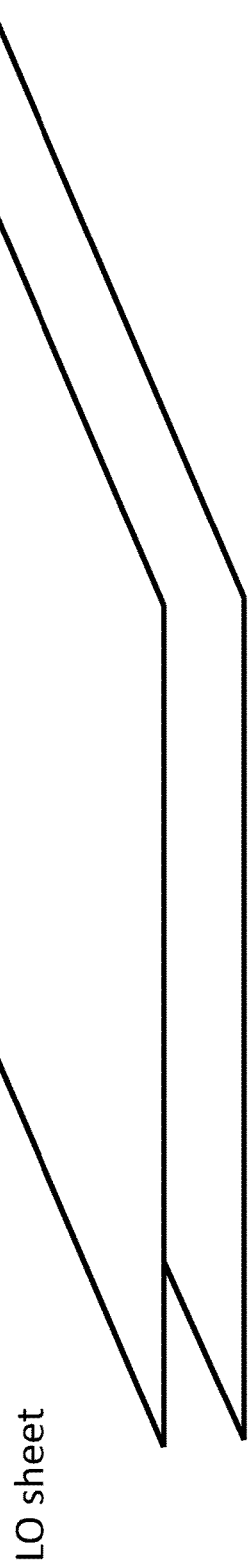
Figure 10:
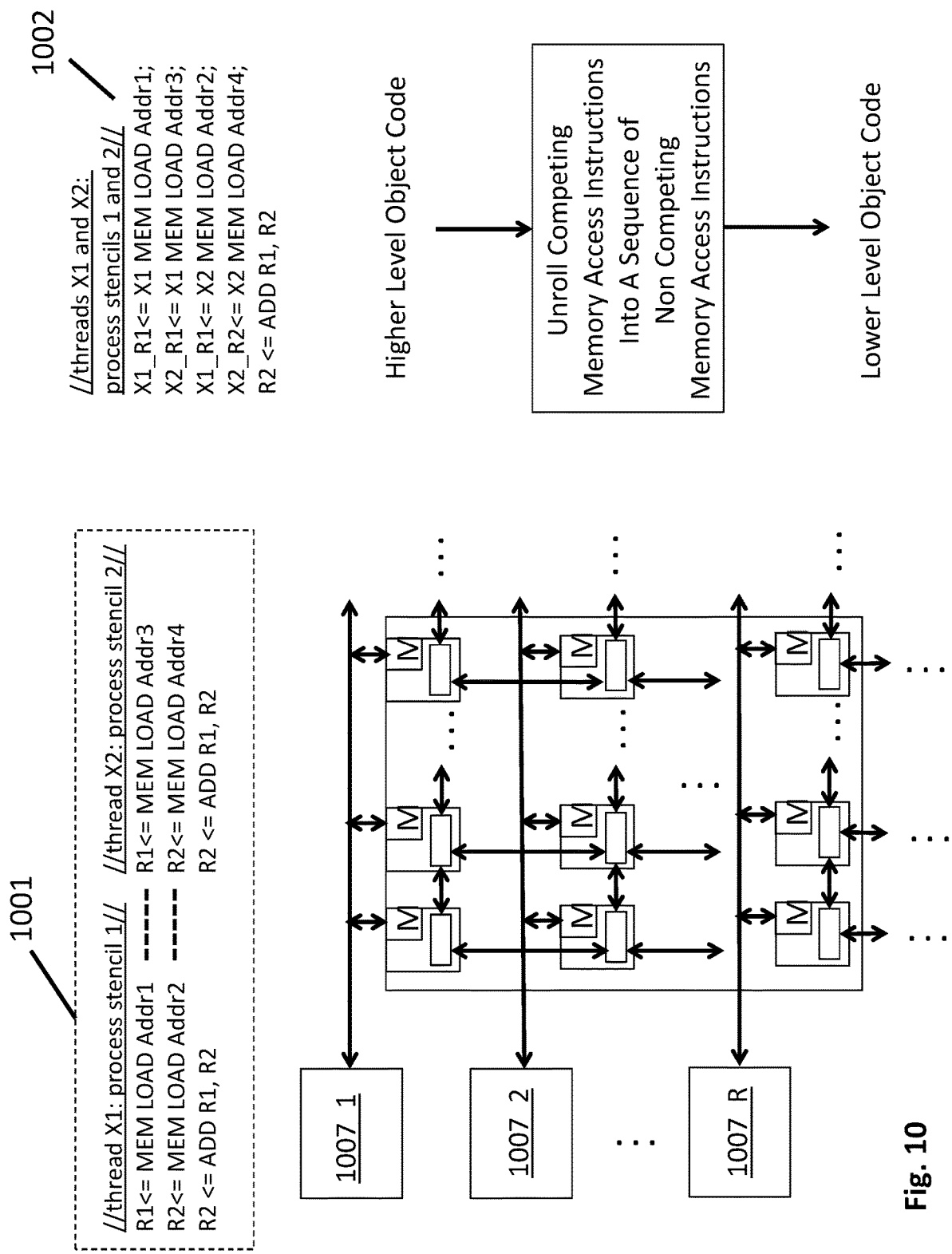
Figure 11:
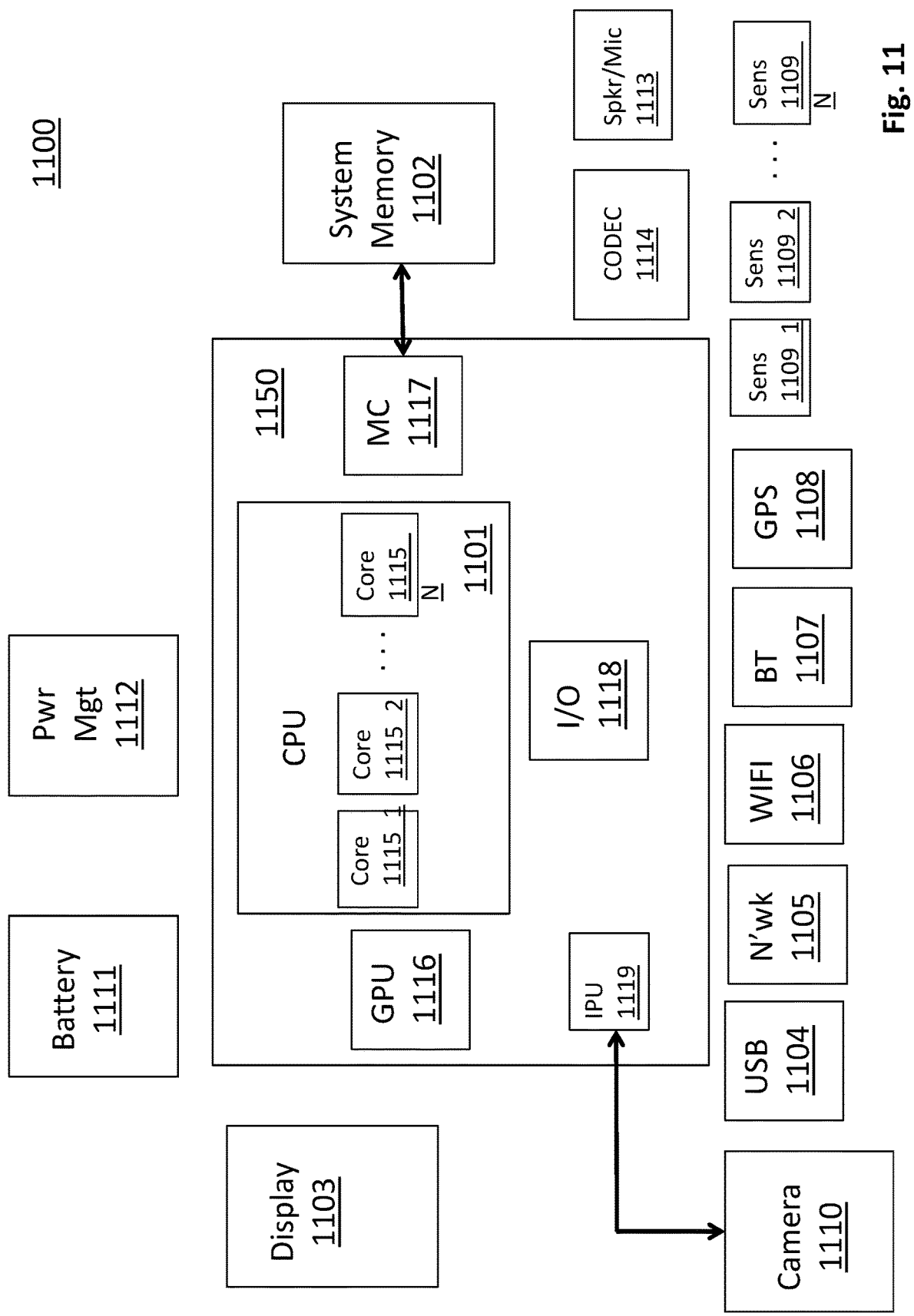

FIG. 9 pertains to operation at higher bit widths that the registers within the register file;

FIG. 10 pertains to controlling memory operations within the execution lane array;

FIG. 11 shows an embodiment of a computing system.

DETAILED DESCRIPTION a. Image Processor Hardware Architecture and Operation

Figure 1:
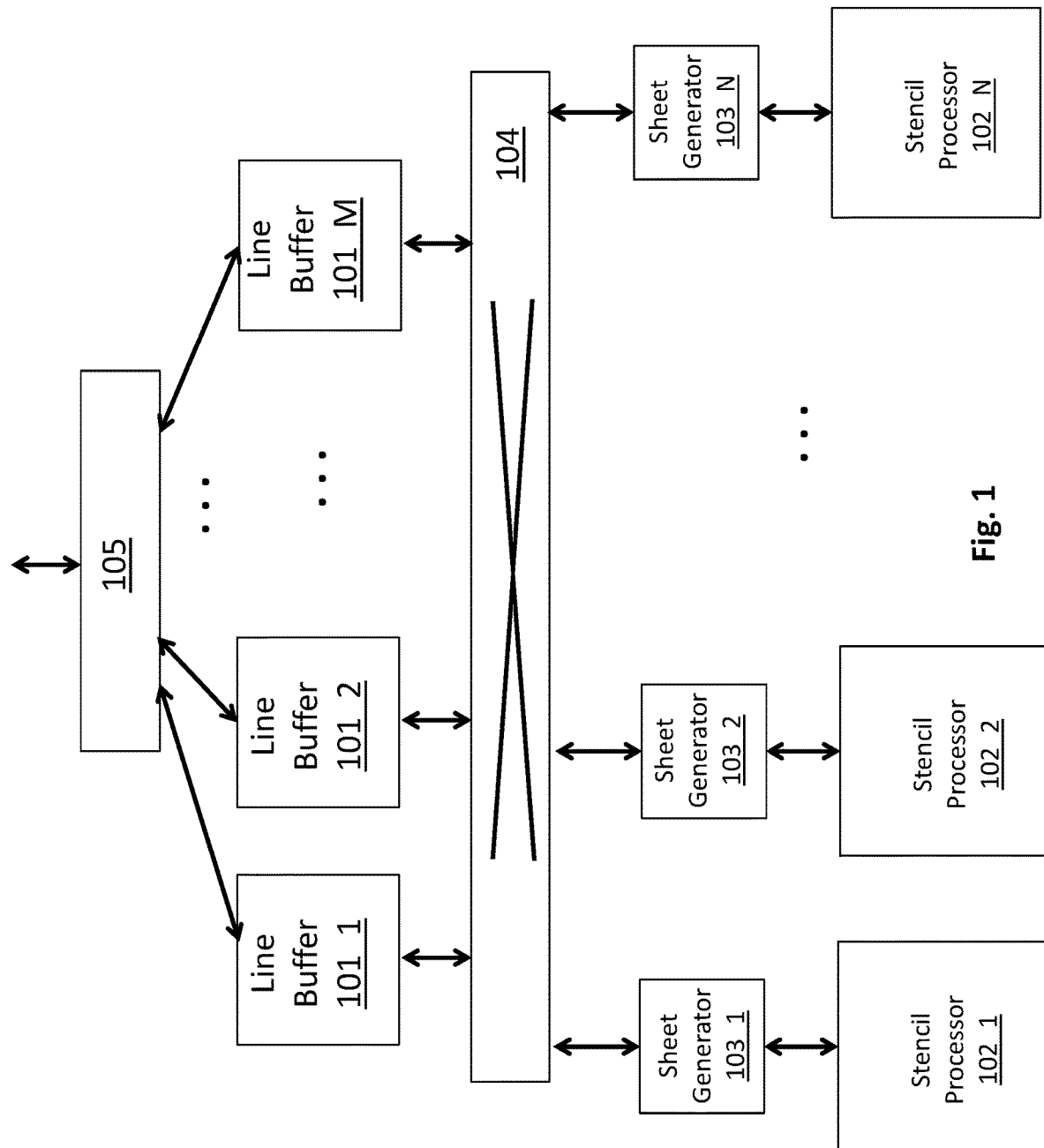
FIG. 1 shows an embodiment of an image processor hardware architecture.

FIG. 1 shows an embodiment of an architecture 100 for an image processor implemented in hardware. The image processor may be targeted, for example, by a compiler that converts program code written for a virtual processor within a simulated environment into program code that is actually executed by the hardware processor. As observed in FIG. 1, the architecture 100 includes a plurality of line buffer units 101_1 through 101_M interconnected to a plurality of stencil processor units 102_1 through 102_N and corresponding sheet generator units 103_1 through 103_N through a network 104 (e.g., a network on chip (NOC) including an on chip switch network, an on chip ring network or other kind of network). In an embodiment, any line buffer unit may connect to any sheet generator and corresponding stencil processor through the network 104.

In an embodiment, program code is compiled and loaded onto a corresponding stencil processor 102 to perform the image processing operations earlier defined by a software developer (program code may also be loaded onto the stencil processor's associated sheet generator 103, e.g., depending on design and implementation). In at least some instances an image processing pipeline may be realized by loading a first kernel program for a first pipeline stage into a first stencil processor 102_1, loading a second kernel program for a second pipeline stage into a second stencil processor 102_2, etc. where the first kernel performs the functions of the first stage of the pipeline, the second kernel performs the functions of the second stage of the pipeline, etc. and additional control flow methods are installed to pass output image data from one stage of the pipeline to the next stage of the pipeline.

In other configurations, the image processor may be realized as a parallel machine having two or more stencil processors 102_1, 102_2 operating the same kernel program code. For example, a highly dense and high data rate stream of image data may be processed by spreading frames across multiple stencil processors each of which perform the same function.

In yet other configurations, essentially any DAG of kernels may be loaded onto the hardware processor by configuring respective stencil processors with their own respective kernel of program code and configuring appropriate control flow hooks into the hardware to direct output images from one kernel to the input of a next kernel in the DAG design.

As a general flow, frames of image data are received by a macro I/O unit 105 and passed to one or more of the line buffer units 101 on a frame by frame basis. A particular line buffer unit parses its frame of image data into a smaller region of image data, referred to as a "a line group", and then passes the line group through the network 104 to a particular sheet generator. A complete or "full" singular line group may be composed, for example, with the data of multiple contiguous complete rows or columns of a frame (for simplicity the present specification will mainly refer to contiguous rows). The sheet generator further parses the line group of image data into a smaller region of image data, referred to as a "sheet", and presents the sheet to its corresponding stencil processor.

In the case of an image processing pipeline or a DAG flow having a single input, generally, input frames are directed to the same line buffer unit 101_1 which parses the image data into line groups and directs the line groups to the sheet generator 103_1 whose corresponding stencil processor 102_1 is executing the code of the first kernel in the pipeline/DAG. Upon completion of operations by the stencil processor 102_1 on the line groups it processes, the sheet generator 103_1 sends output line groups to a "downstream" line buffer unit 101_2 (in some use cases the output line group may be sent back to the same line buffer unit 101_1 that earlier had sent the input line groups).

One or more "consumer" kernels that represent the next stage/operation in the pipeline/DAG executing on their own respective other sheet generator and stencil processor (e.g., sheet generator 103_2 and stencil processor 102_2) then receive from the downstream line buffer unit 101_2 the image data generated by the first stencil processor 102_1. In this manner, a "producer" kernel operating on a first stencil processor has its output data forwarded to a "consumer" kernel operating on a second stencil processor where the consumer kernel performs the next set of tasks after the producer kernel consistent with the design of the overall pipeline or DAG.

A stencil processor 102 is designed to simultaneously operate on multiple overlapping stencils of image data. The multiple overlapping stencils and internal hardware processing capacity of the stencil processor effectively determines the size of a sheet. Here, within a stencil processor 102, arrays of execution lanes operate in unison to simultaneously process the image data surface area covered by the multiple overlapping stencils.

As will be described in more detail below, in various embodiments, sheets of image data are loaded into a two-dimensional register array structure within the stencil processor 102. The use of sheets and the two-dimensional register array structure is believed to effectively provide for power consumption improvements by moving a large amount of data into a large amount of register space as, e.g., a single load operation with processing tasks performed directly on the data immediately thereafter by an execution lane array. Additionally, the use of an execution lane array and corresponding register array provide for different stencil sizes that are easily programmable/configurable.

FIGS. 2a through 2e illustrate at a high level embodiments of both the parsing activity of a line buffer unit 101, the finer grained parsing activity of a sheet generator unit 103 as well as the stencil processing activity of the stencil processor 102 that is coupled to the sheet generator unit 103.

Figure 2A:
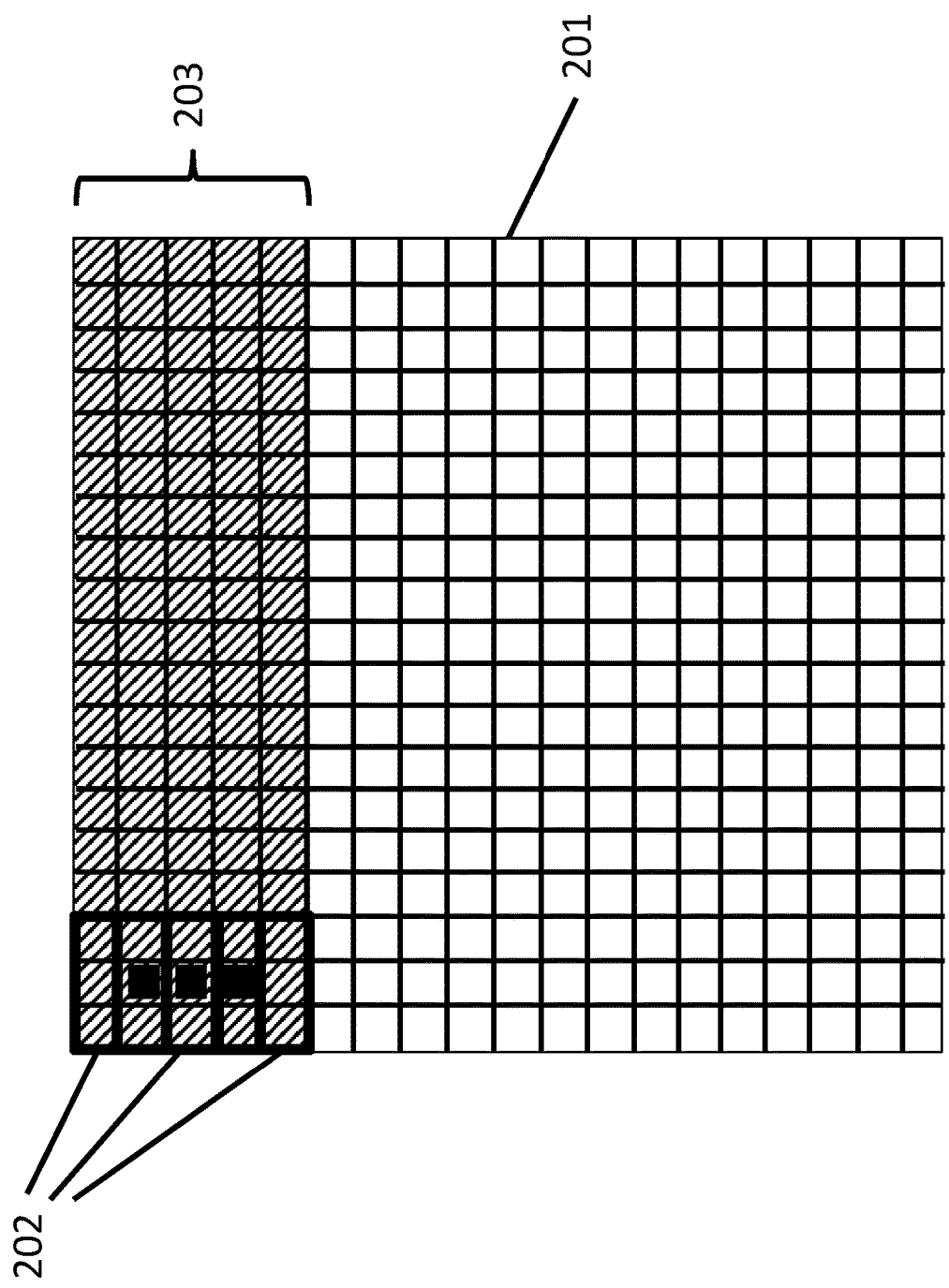

FIG. 2a depicts an embodiment of an input frame of image data 201. FIG. 2a also depicts an outline of three overlapping stencils 202 (each having a dimension of 3 pixels×3 pixels) that a stencil processor is designed to operate over. The output pixel that each stencil respectively generates output image data for is highlighted in solid black. For simplicity, the three overlapping stencils 202 are depicted as overlapping only in the vertical direction. It is pertinent to recognize that in actuality a stencil processor may be designed to have overlapping stencils in both the vertical and horizontal directions.

Because of the vertical overlapping stencils 202 within the stencil processor, as observed in FIG. 2a, there exists a wide band of image data within the frame that a single stencil processor can operate over. As will be discussed in more detail below, in an embodiment, the stencil processors process data within their overlapping stencils in a left to right fashion across the image data (and then repeat for the next set of lines, in top to bottom order). Thus, as the stencil processors continue forward with their operation, the number of solid black output pixel blocks will grow right-wise horizontally. As discussed above, a line buffer unit 101 is responsible for parsing a line group of input image data from an incoming frame that is sufficient for the stencil processors to operate over for an extended number of upcoming cycles. An exemplary depiction of a line group is illustrated as a shaded region 203. In an embodiment, the line buffer unit 101 can comprehend different dynamics for sending/receiving a line group to/from a sheet generator. For example, according to one mode, referred to as "full group", the complete full width lines of image data are passed between a line buffer unit and a sheet generator. According to a second mode, referred to as "virtually tall", a line group is passed initially with a subset of full width rows. The remaining rows are then passed sequentially in smaller (less than full width) pieces.

With the line group 203 of the input image data having been defined by the line buffer unit and passed to the sheet generator unit, the sheet generator unit further parses the line group into finer sheets that are more precisely fitted to the hardware limitations of the stencil processor. More specifically, as will be described in more detail further below, in an embodiment, each stencil processor consists of a two dimensional shift register array. The two dimensional shift register array essentially shifts image data "beneath" an array of execution lanes where the pattern of the shifting causes each execution lane to operate on data within its own respective stencil (that is, each execution lane processes on its own stencil of information to generate an output for that stencil). In an embodiment, sheets are surface areas of input image data that "fill" or are otherwise loaded into the two dimensional shift register array.

As will be described in more detail below, in various embodiments, there are actually multiple layers of two dimensional register data that can be shifted on any cycle. For convenience, much of the present description will simply use the term "two-dimensional shift register" and the like to refer to structures that have one or more such layers of two-dimensional register data that can be shifted.

Figure 2B:
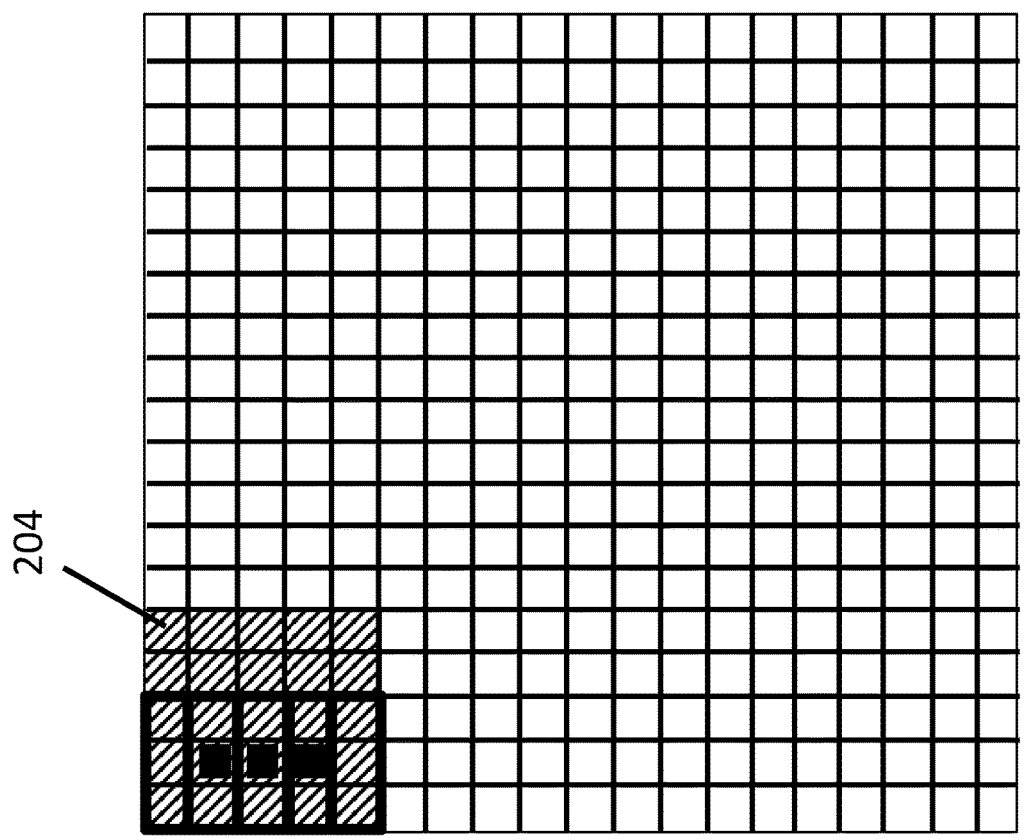
Figure 2C:
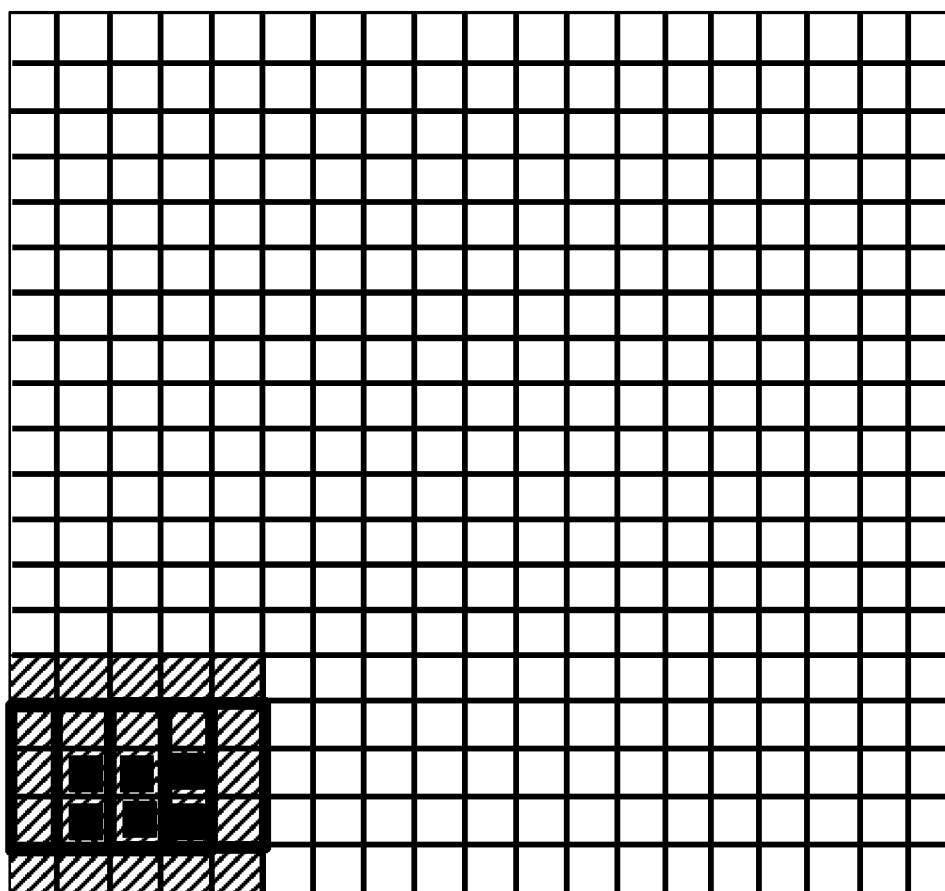

Thus, as observed in FIG. 2b, the sheet generator parses an initial sheet 204 from the line group 203 and provides it to the stencil processor (here, the sheet of data corresponds to the shaded region that is generally identified by reference number 204). As observed in FIGS. 2c and 2d, the stencil processor operates on the sheet of input image data by effectively moving the overlapping stencils 202 in a left to right fashion over the sheet. As of FIG. 2d, the number of pixels for which an output value could be calculated from the data within the sheet is exhausted (no other pixel positions can have an output value determined from the information within the sheet). For simplicity the border regions of the image have been ignored.

As observed in FIG. 2e the sheet generator then provides a next sheet 205 for the stencil processor to continue operations on. Note that the initial positions of the stencils as they begin operation on the next sheet is the next progression to the right from the point of exhaustion on the first sheet (as depicted previously in FIG. 2d). With the new sheet 205, the stencils will simply continue moving to the right as the stencil processor operates on the new sheet in the same manner as with the processing of the first sheet.

Note that there is some overlap between the data of the first sheet 204 and the data of the second sheet 205 owing to the border regions of stencils that surround an output pixel location. The overlap could be handled simply by the sheet generator re-transmitting the overlapping data twice. In alternate implementations, to feed a next sheet to the stencil processor, the sheet generator may proceed to only send new data to the stencil processor and the stencil processor reuses the overlapping data from the previous sheet.

b. Stencil Processor Design and Operation

Figure 3A:
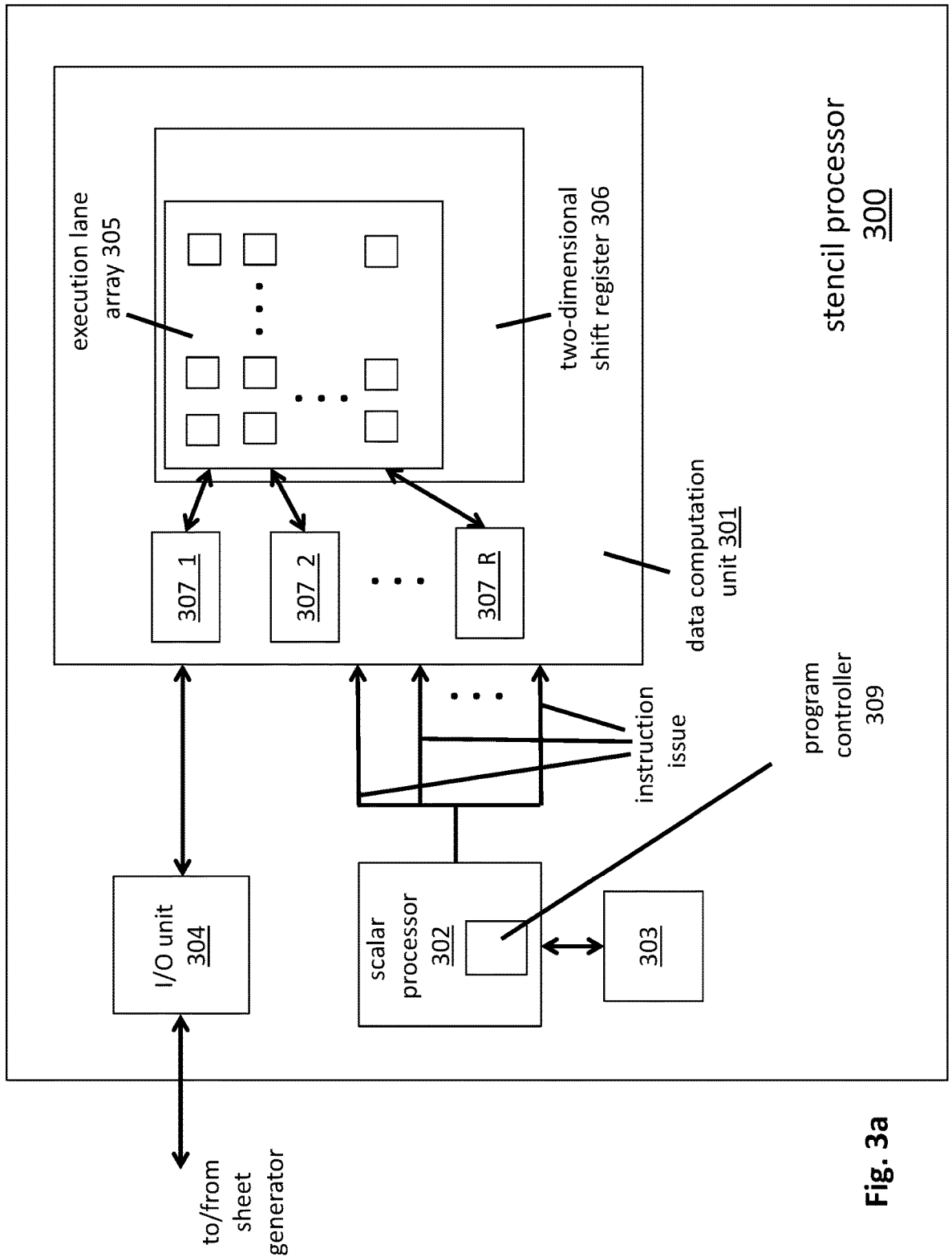
FIG. 3a shows an embodiment of a stencil processor.

FIG. 3a shows an embodiment of a stencil processor architecture 300. As observed in FIG. 3a, the stencil processor includes a data computation unit 301, a scalar processor 302 and associated memory 303 and an I/O unit 304. The data computation unit 301 includes an array of execution lanes 305, a two-dimensional shift array structure 306 and separate random access memories 307 associated with specific rows or columns of the array.

The I/O unit 304 is responsible for loading "input" sheets of data received from the sheet generator into the data computation unit 301 and storing "output" sheets of data from the stencil processor into the sheet generator. In an embodiment the loading of sheet data into the data computation unit 301 entails parsing a received sheet into rows/columns of image data and loading the rows/columns of image data into the two dimensional shift register structure 306 or respective random access memories 307 of the rows/columns of the execution lane array (described in more detail below). If the sheet is initially loaded into memories 307, the individual execution lanes within the execution lane array 305 may then load sheet data into the two-dimensional shift register structure 306 from the random access memories 307 when appropriate (e.g., as a load instruction just prior to operation on the sheet's data). Upon completion of the loading of a sheet of data into the register structure 306 (whether directly from a sheet generator or from memories 307), the execution lanes of the execution lane array 305 operate on the data and eventually "write back" finished data as a sheet directly back to the sheet generator, or, into the random access memories 307. If the later the I/O unit 304 fetches the data from the random access memories 307 to form an output sheet which is then forwarded to the sheet generator.

The scalar processor 302 includes a program controller 309 that reads the instructions of the stencil processor's program code from scalar memory 303 and issues the instructions to the execution lanes in the execution lane array 305. In an embodiment, a single same instruction is broadcast to all execution lanes within the array 305 to effect a SIMD-like behavior from the data computation unit 301. In an embodiment, the instruction format of the instructions read from scalar memory 303 and issued to the execution lanes of the execution lane array 305 includes a very-long-instruction-word (VLIW) type format that includes more than one opcode per instruction. In a further embodiment, the VLIW format includes both an ALU opcode that directs a mathematical function performed by each execution lane's ALU (which, as described below, in an embodiment may specify more than one traditional ALU operation) and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more MIMD-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 305).

The combination of an execution lane array 305, program controller 309 and two dimensional shift register structure 306 provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

Apart from acting as a data store for image data being operated on by the execution lane array 305, the random access memories 307 may also keep one or more look-up tables. In various embodiments one or more scalar look-up tables may also be instantiated within the scalar memory 303.

A scalar look-up involves passing the same data value from the same look-up table from the same index to each of the execution lanes within the execution lane array 305. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look-up from a scalar look-up table within scalar memory essentially involves broadcasting the same data value to all execution lanes within the execution lane array 305 during the same clock cycle. Additional details concerning use and operation of look-up tables is provided further below.

FIG. 3b summarizes the VLIW instruction word embodiments(s) discussed above. As observed in FIG. 3b, the VLIW instruction word format includes fields for three separate instructions: 1) a scalar instruction 351 that is executed by the scalar processor; 2) an ALU instruction 352 that is broadcasted and executed in SIMD fashion by the respective ALUs within the execution lane array; and, 3) a memory instruction 353 that is broadcasted and executed in a partial SIMD fashion (e.g., if execution lanes along a same row in the execution lane array share a same random access memory, then one execution lane from each of the different rows actually execute the instruction (the format of the memory instruction 353 may include an operand that identifies which execution lane from each row executes the instruction)

A field 354 for one or more immediate operands is also included. Which of the instructions 351, 352, 353 use which immediate operand information may be identified in the instruction format. Each of instructions 351, 352, 353 also include their own respective input operand and resultant information (e.g., local registers for ALU operations and a local register and a memory address for memory access instructions). In an embodiment, the scalar instruction 351 is executed by the scalar processor before the execution lanes within the execution lane array execute either of the other to instructions 352, 353. That is, the execution of the VLIW word includes a first cycle upon which the scalar instruction 351 is executed followed by a second cycle upon with the other instructions 352, 353 may be executed (note that in various embodiments instructions 352 and 353 may be executed in parallel).

In an embodiment, the scalar instructions executed by the scalar processor include commands issued to the sheet generator to load/store sheets from/into the memories or 2D shift register of the data computation unit. Here, the sheet generator's operation can be dependent on the operation of the line buffer unit or other variables that prevent pre-runtime comprehension of the number of cycles it will take the sheet generator to complete any command issued by the scalar processor. As such, in an embodiment, any VLIW word whose scalar instruction 351 corresponds to or otherwise causes a command to be issued to the sheet generator also includes no-operation (NOOP) instructions in the other two instruction field 352, 353. The program code then enters a loop of NOOP instructions for instruction fields 352, 353 until the sheet generator completes its load/store to/from the data computation unit. Here, upon issuing a command to the sheet generator, the scalar processor may set a bit of an interlock register that the sheet generator resets upon completion of the command. During the NOOP loop the scalar processor monitors the bit of the interlock bit. When the scalar processor detects that the sheet generator has completed its command normal execution begins again.

Figure 4:
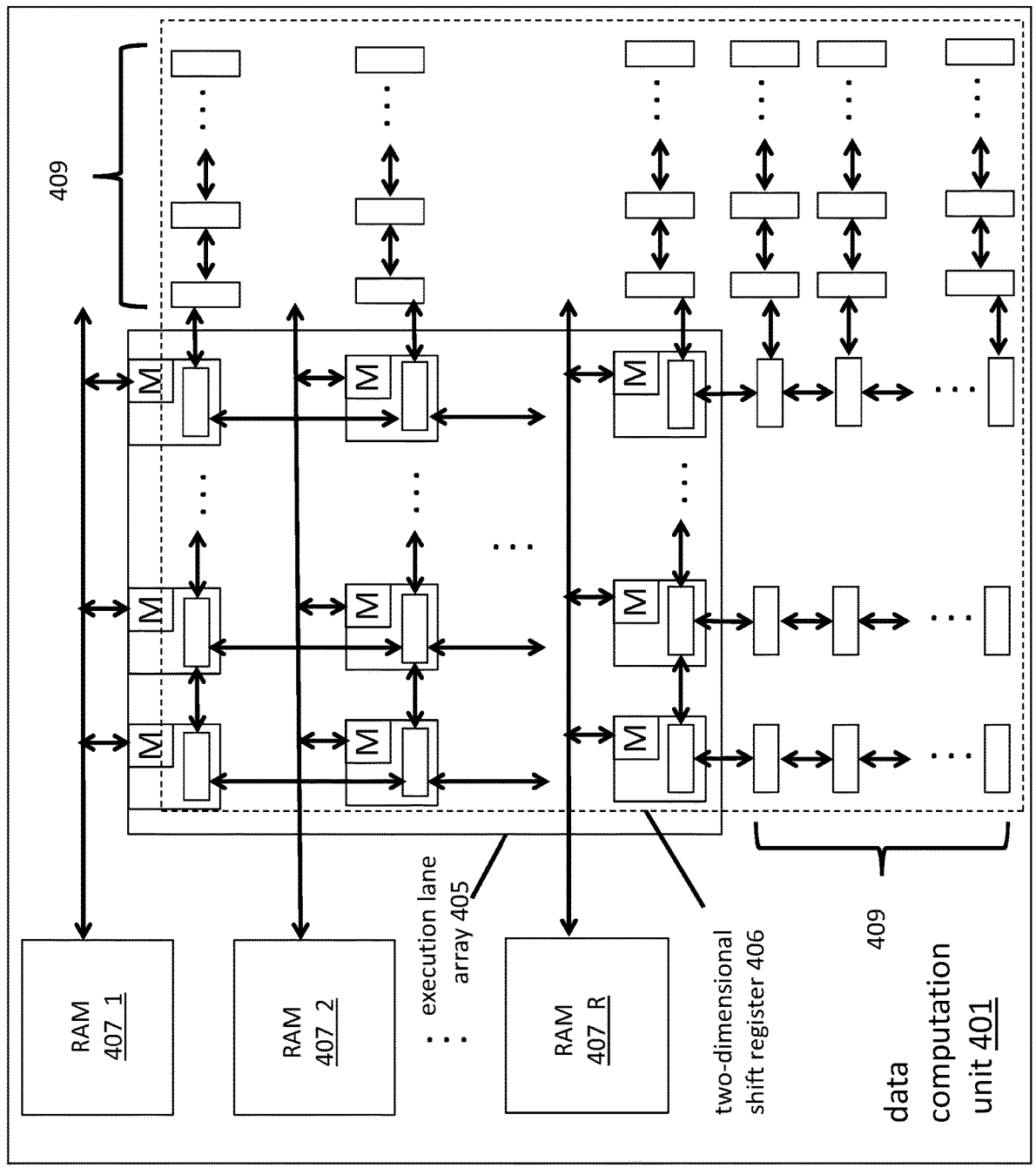
FIG. 4 shows an embodiment of a data computation unit within a stencil processor.

FIG. 4 shows an embodiment of a data computation component 401. As observed in FIG. 4, the data computation component 401 includes an array of execution lanes 405 that are logically positioned "above" a two-dimensional shift register array structure 406. As discussed above, in various embodiments, a sheet of image data provided by a sheet generator is loaded into the two-dimensional shift register 406. The execution lanes then operate on the sheet data from the register structure 406.

The execution lane array 405 and shift register structure 406 are fixed in position relative to one another. However, the data within the shift register array 406 shifts in a strategic and coordinated fashion to cause each execution lane in the execution lane array to process a different stencil within the data. As such, each execution lane determines the output image value for a different pixel in the output sheet being generated. From the architecture of FIG. 4 it should be clear that overlapping stencils are not only arranged vertically but also horizontally as the execution lane array 405 includes vertically adjacent execution lanes as well as horizontally adjacent execution lanes.

Some notable architectural features of the data computation unit 401 include the shift register structure 406 having wider dimensions than the execution lane array 405. That is, there is a "halo" of registers 409 outside the execution lane array 405. Although the halo 409 is shown to exist on two sides of the execution lane array, depending on implementation, the halo may exist on less (one) or more (three or four) sides of the execution lane array 405. The halo 405 serves to provide "spill-over" space for data that spills outside the bounds of the execution lane array 405 as the data is shifting "beneath" the execution lanes 405. As a simple case, a 5×5 stencil centered on the right edge of the execution lane array 405 will need four halo register locations further to the right when the stencil's leftmost pixels are processed. For ease of drawing, FIG. 4 shows the registers of the right side of the halo as only having horizontal shift connections and registers of the bottom side of the halo as only having vertical shift connections when, in a nominal embodiment, registers on either side (right, bottom) would have both horizontal and vertical connections.

Additional spill-over room is provided by random access memories 407 that are coupled to each row and/or each column in the array, or portions thereof (E.g., a random access memory may be assigned to a "region" of the execution lane array that spans 4 execution lanes row wise and 2 execution lanes column wise. For simplicity the remainder of the application will refer mainly to row and/or column based allocation schemes). Here, if an execution lane's kernel operations require it to process pixel values outside of the two-dimensional shift register array 406 (which some image processing routines may require) the plane of image data is able to further spill-over, e.g., from the halo region 409 into random access memory 407. For example, consider a 6×6 stencil where the hardware includes a halo region of only four storage elements to the right of an execution lane on the right edge of the execution lane array. In this case, the data would need to be shifted further to the right off the right edge of the halo 409 to fully process the stencil. Data that is shifted outside the halo region 409 would then spill-over to random access memory 407. Other applications of the random access memories 407 and the stencil processor of FIG. 3 are provided further below.

FIGS. 5a through 5k demonstrate a working example of the manner in which image data is shifted within the two dimensional shift register array "beneath" the execution lane array as alluded to above. As observed in FIG. 5a, the data contents of the two dimensional shift array are depicted in a first array 507 and the execution lane array is depicted by a frame 505. Also, two neighboring execution lanes 510 within the execution lane array are simplistically depicted.

In this simplistic depiction 510, each execution lane includes a register R1 that can accept data from the shift register, accept data from an ALU output (e.g., to behave as an accumulator across cycles), or write output data into an output destination.

Each execution lane also has available, in a local register R2, the contents "beneath" it in the two dimensional shift array. Thus, R1 is a physical register of the execution lane while R2 is a physical register of the two dimensional shift register array. The execution lane includes an ALU that can operate on operands provided by R1 and/or R2. As will be described in more detail further below, in an embodiment the shift register is actually implemented with multiple (a "depth" of) storage/register elements per array location but the shifting activity is limited to one plane of storage elements (e.g., only one plane of storage elements can shift per cycle). FIGS. 5a through 5k depict one of these deeper register locations as being used to store the resultant X from the respective execution lanes. For illustrative ease the deeper resultant register is drawn alongside rather than beneath its counterpart register R2.

FIGS. 5a through 5k focus on the calculation of two stencils whose central position is aligned with the pair of execution lane positions 511 depicted within the execution lane array. For ease of illustration, the pair of execution lanes 510 are drawn as horizontal neighbors when in fact, according to the following example, they are vertical neighbors.

Figure 5A:
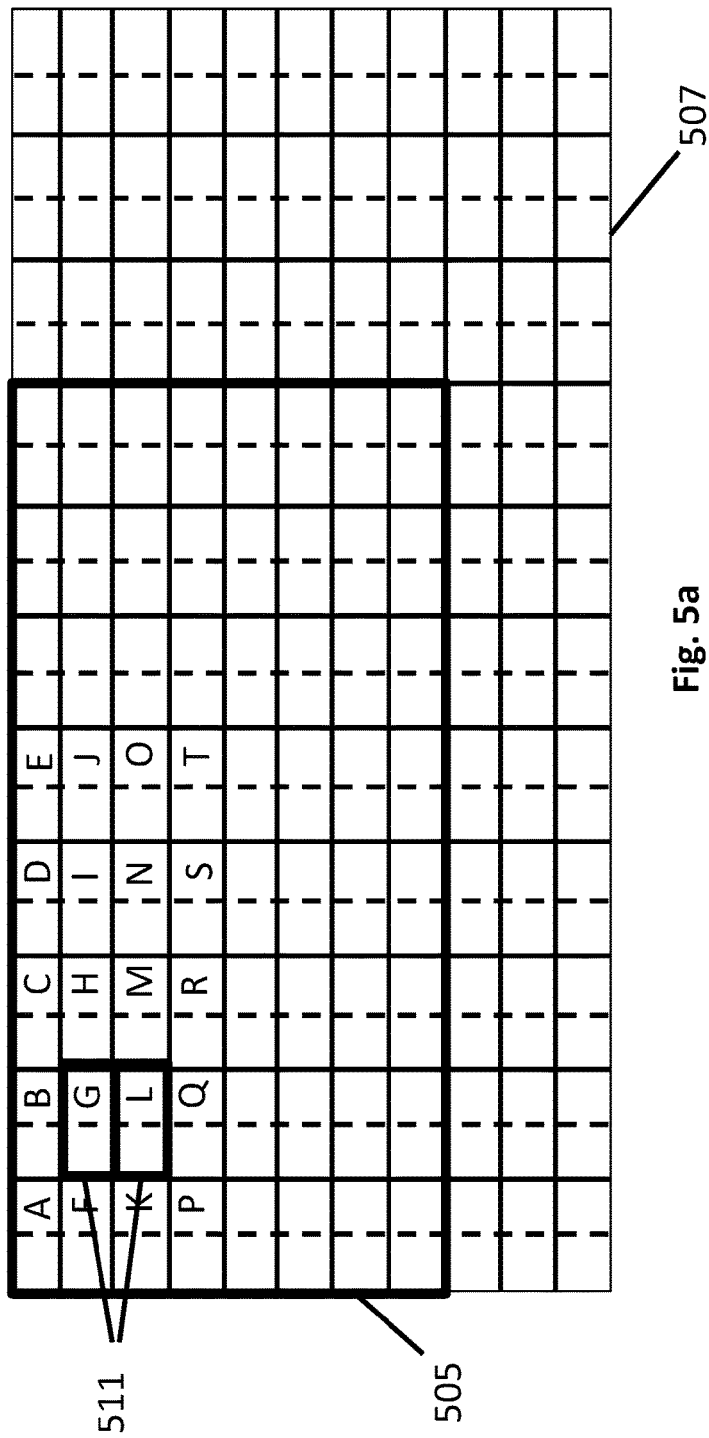
FIGS. 5a, 5b, 5c, 5d, 5e, 5f, 5g, 5h, 5i, 5j and 5k depict an example of the use of a two-dimensional shift array and an execution lane array to determine a pair of neighboring output pixel values with overlapping stencils.
Figure 5A:
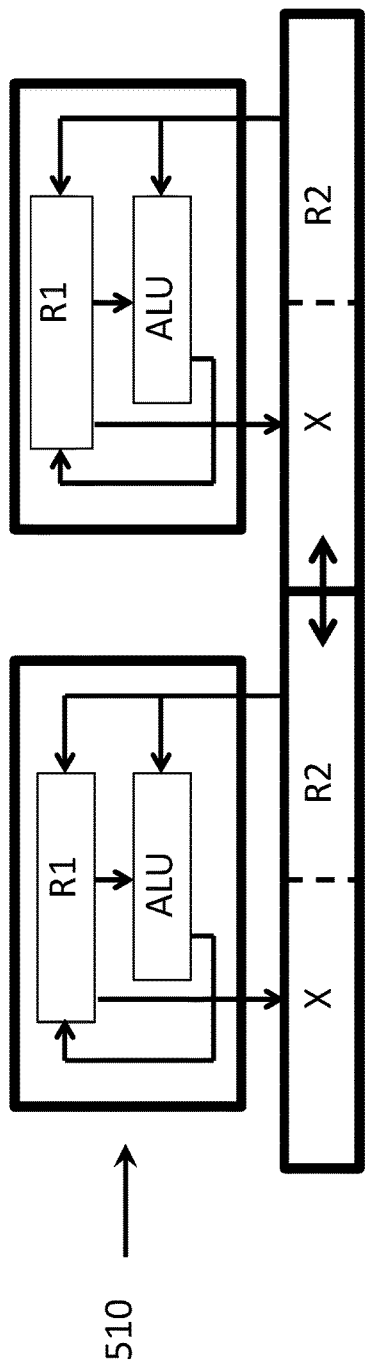
Figure 5B:
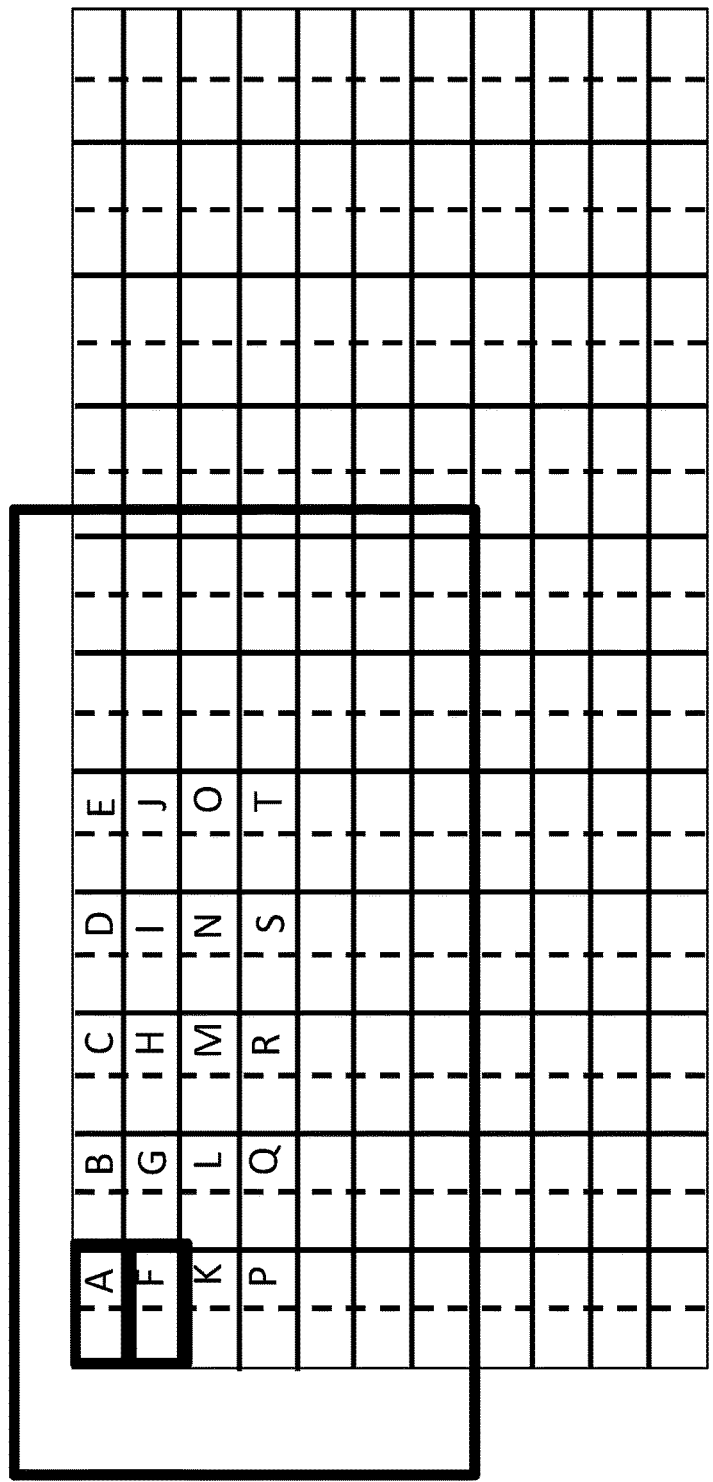

As observed initially in FIG. 5a, the execution lanes are centered on their central stencil locations. FIG. 5b shows the object code executed by both execution lanes. As observed in FIG. 5b the program code of both execution lanes causes the data within the shift register array to shift down one position and shift right one position. This aligns both execution lanes to the upper left hand corner of their respective stencils. The program code then causes the data that is located (in R2) in their respective locations to be loaded into R1.

Figure 5C:
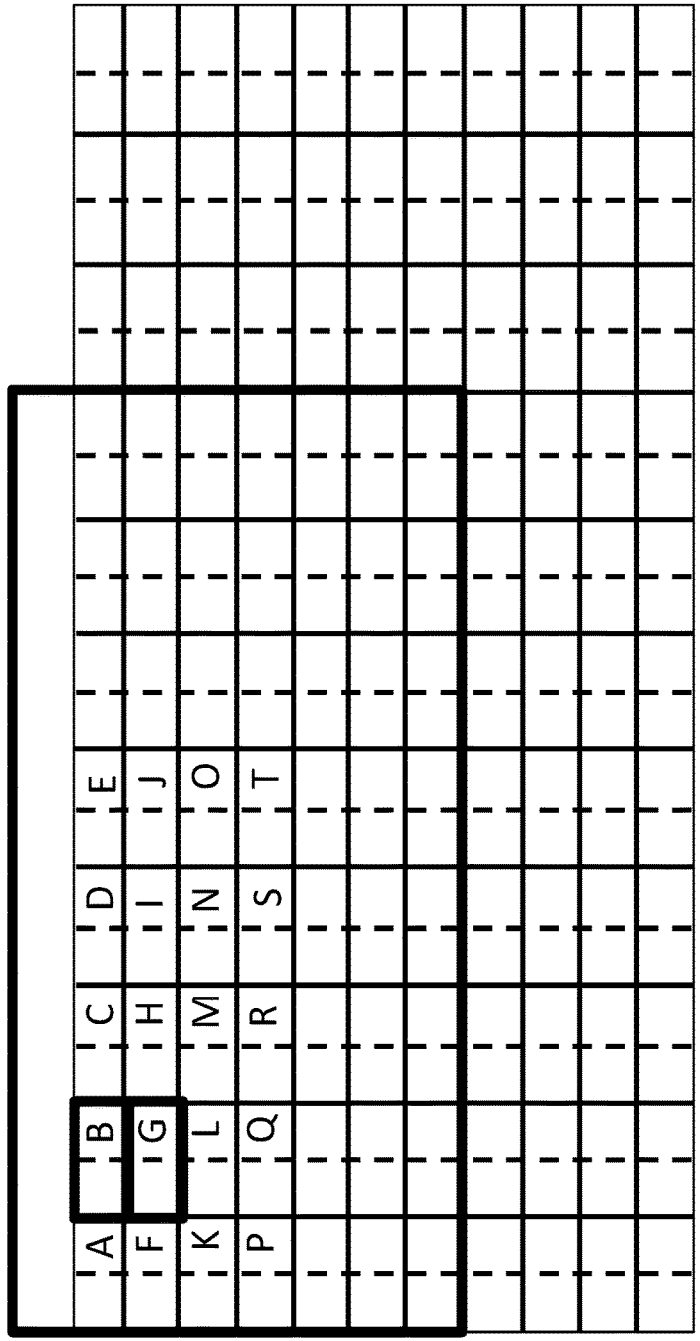
Figure 5D:
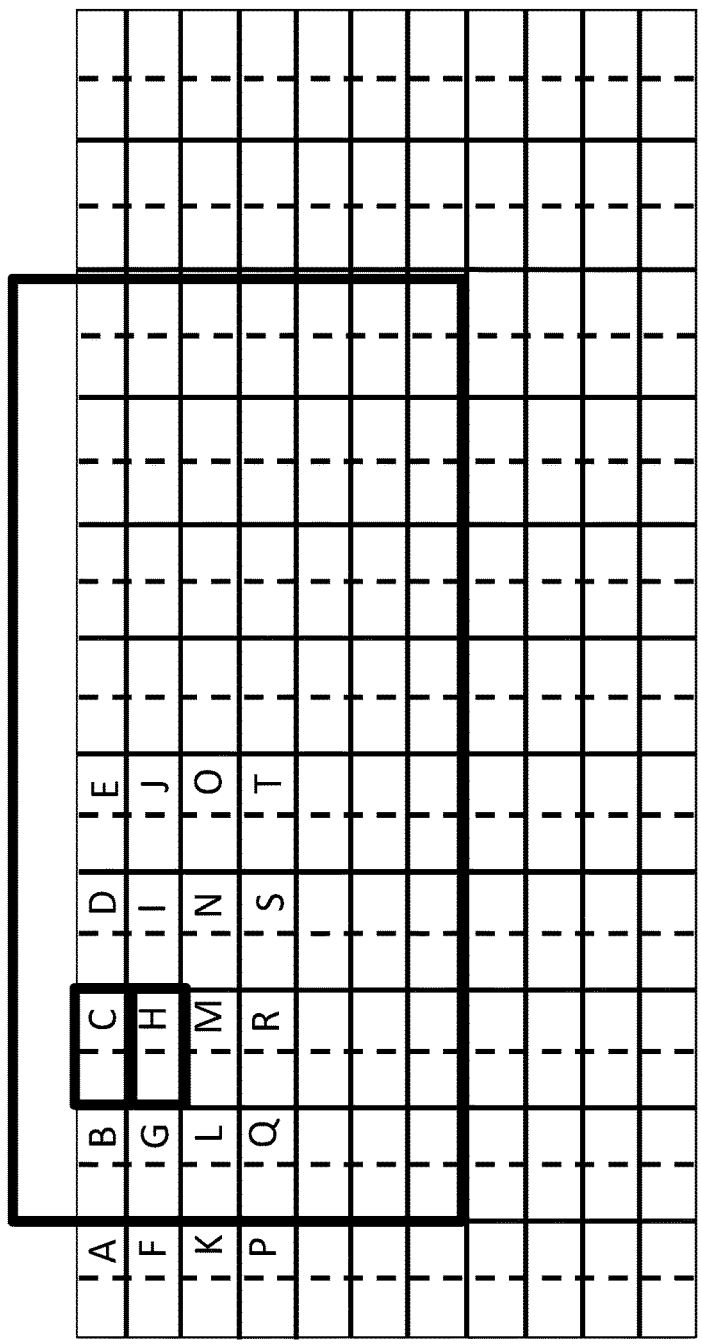

As observed in FIG. 5c the program code next causes the pair of execution lanes to shift the data within the shift register array one unit to the left which causes the value to the right of each execution lane's respective position to be shifted into each execution lane' position. The value in R1 (previous value) is then added with the new value that has shifted into the execution lane's position (in R2). The resultant is written into R1. As observed in FIG. 5d the same process as described above for FIG. 5c is repeated which causes the resultant R1 to now include the value A+B+C in the upper execution lane and F+G+H in the lower execution lane. At this point both execution lanes have processed the upper row of their respective stencils. Note the spill-over into a halo region on the left side of the execution lane array (if one exists on the left hand side) or into random access memory if a halo region does not exist on the left hand side of the execution lane array.

Figure 5E:
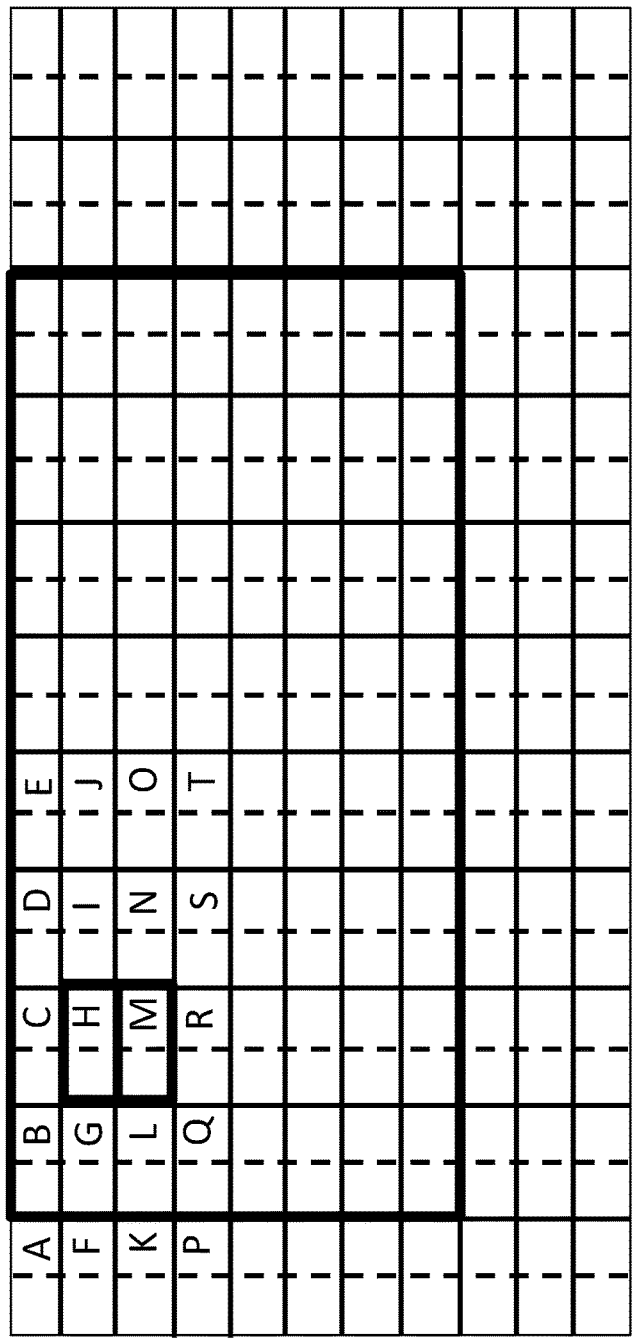
Figure 5F:
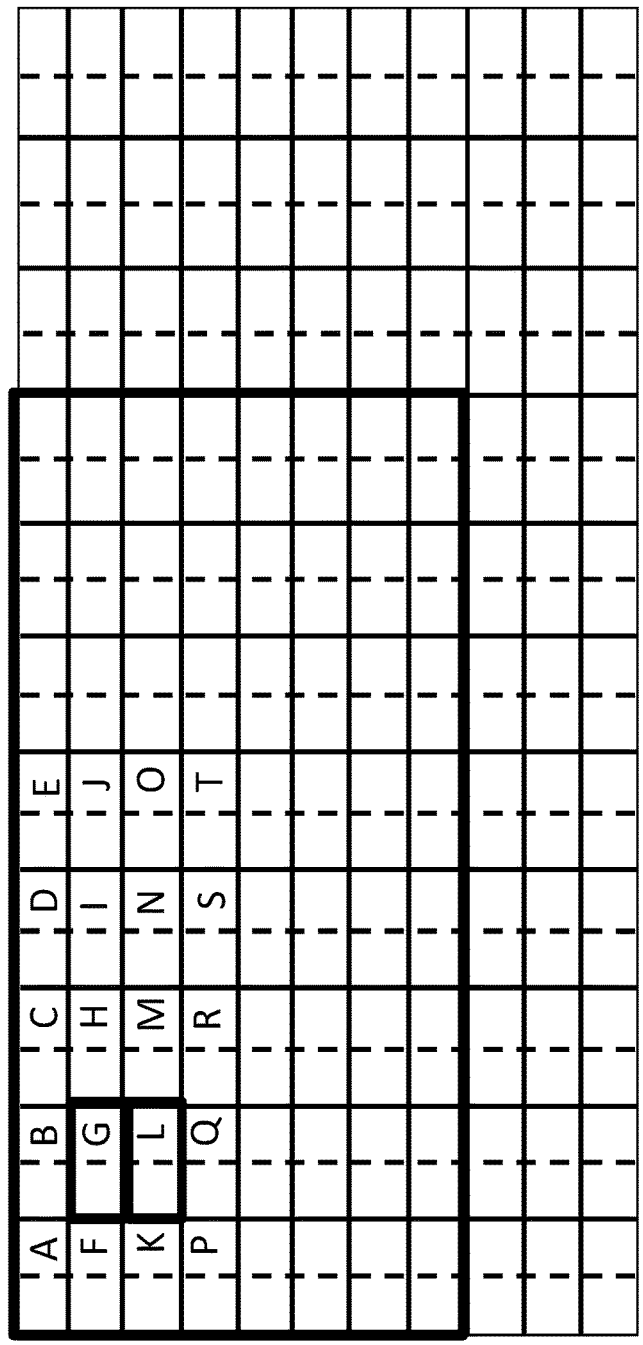
Figure 5G:
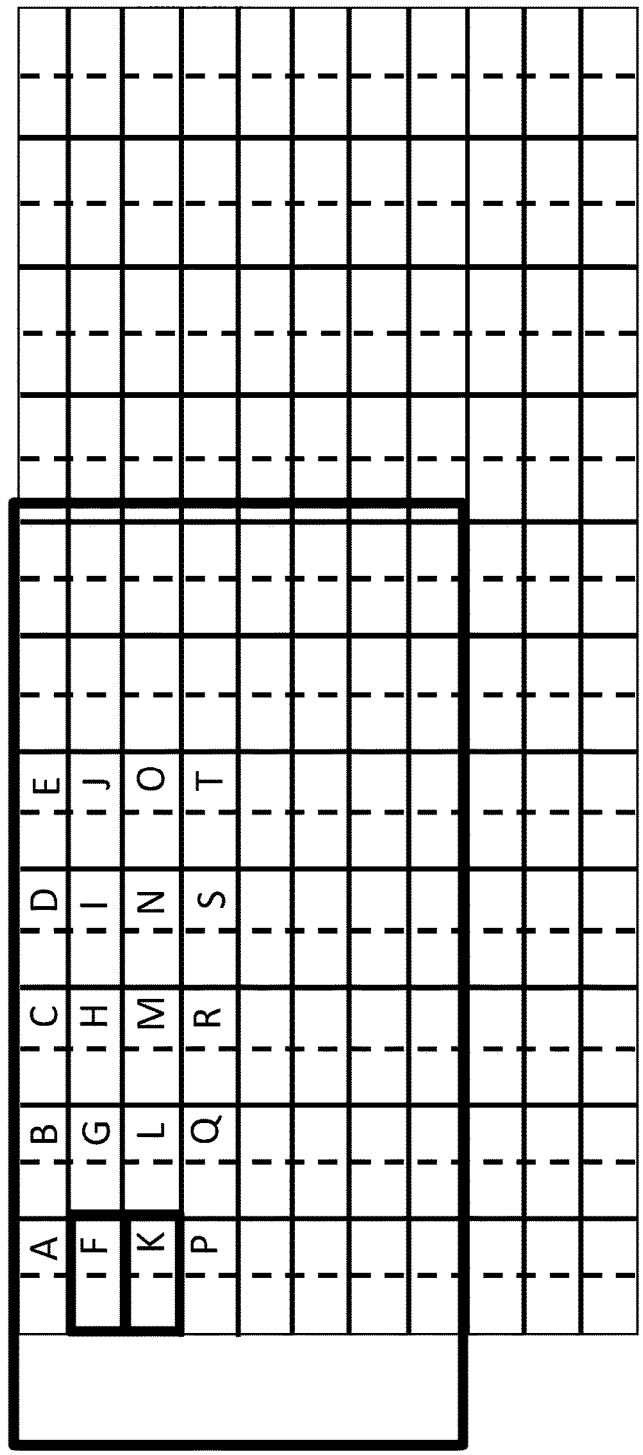

As observed in FIG. 5e, the program code next causes the data within the shift register array to shift one unit up which causes both execution lanes to be aligned with the right edge of the middle row of their respective stencils. Register R1 of both execution lanes currently includes the summation of the stencil's top row and the middle row's rightmost value. FIGS. 5f and 5g demonstrate continued progress moving leftwise across the middle row of both execution lane's stencils. The accumulative addition continues such that at the end of processing of FIG. 5g both execution lanes include the summation of the values of the top row and the middle row of their respective stencils.

Figure 5H:
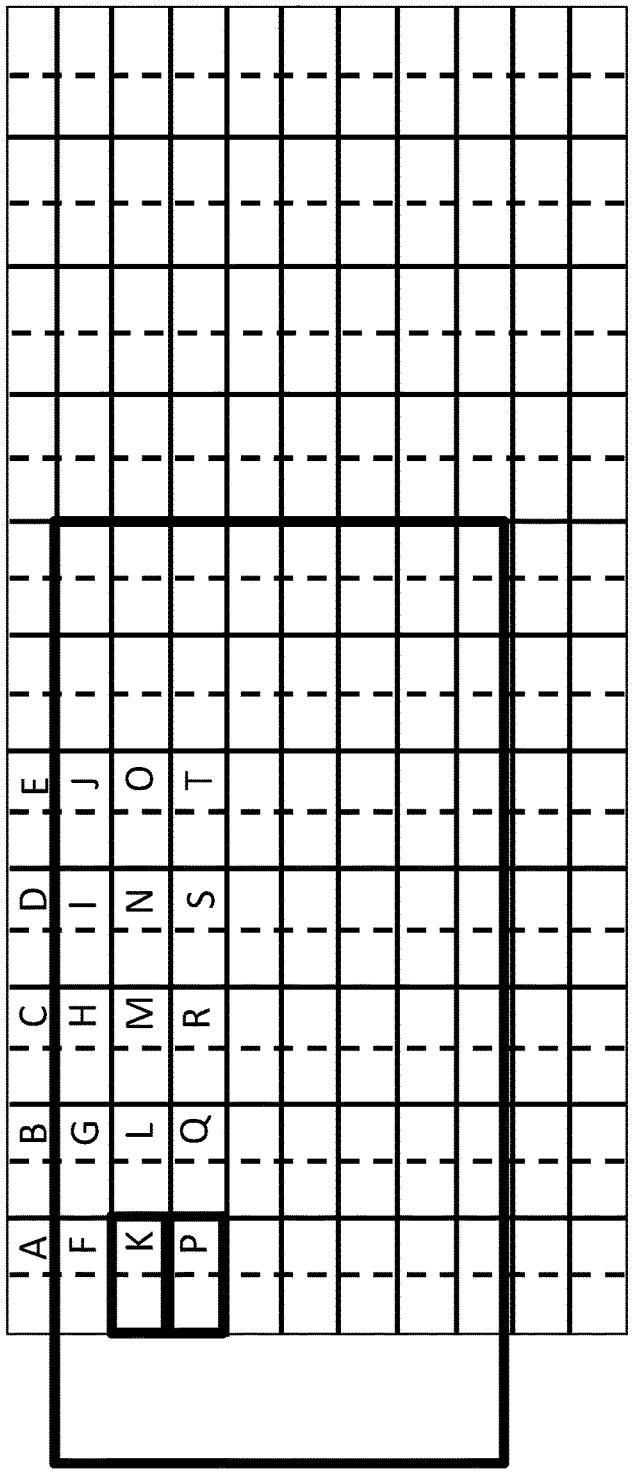
Figure 5I:
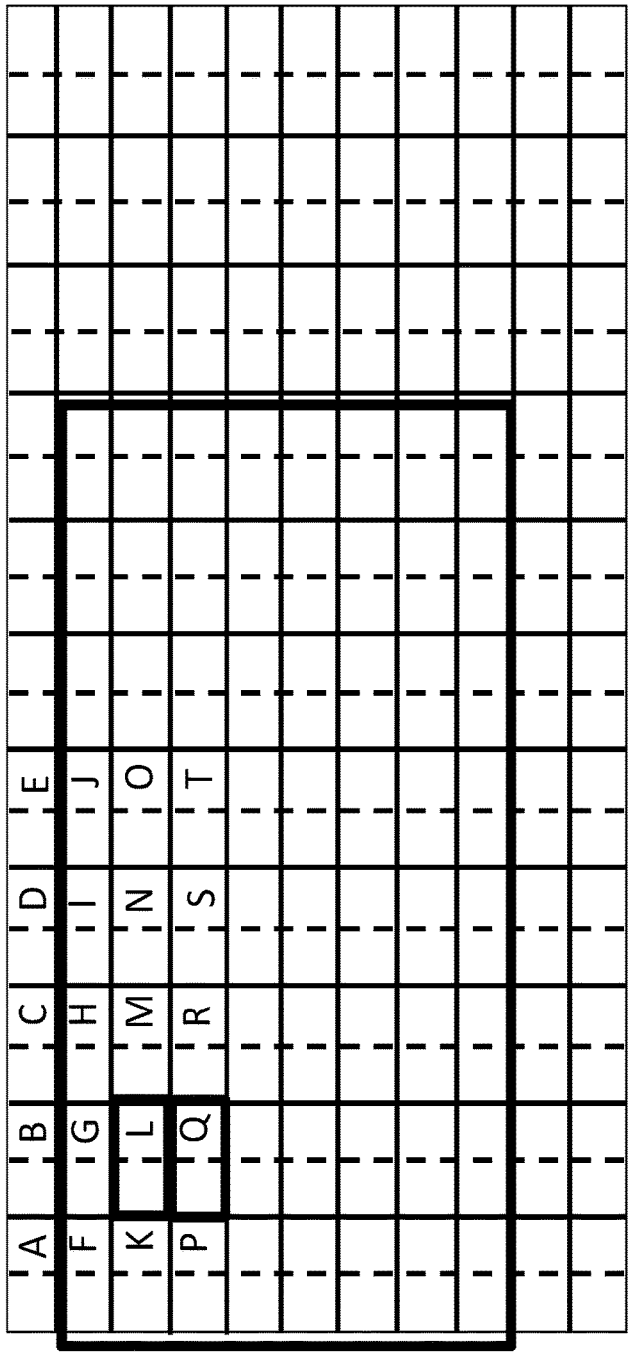
Figure 5J:
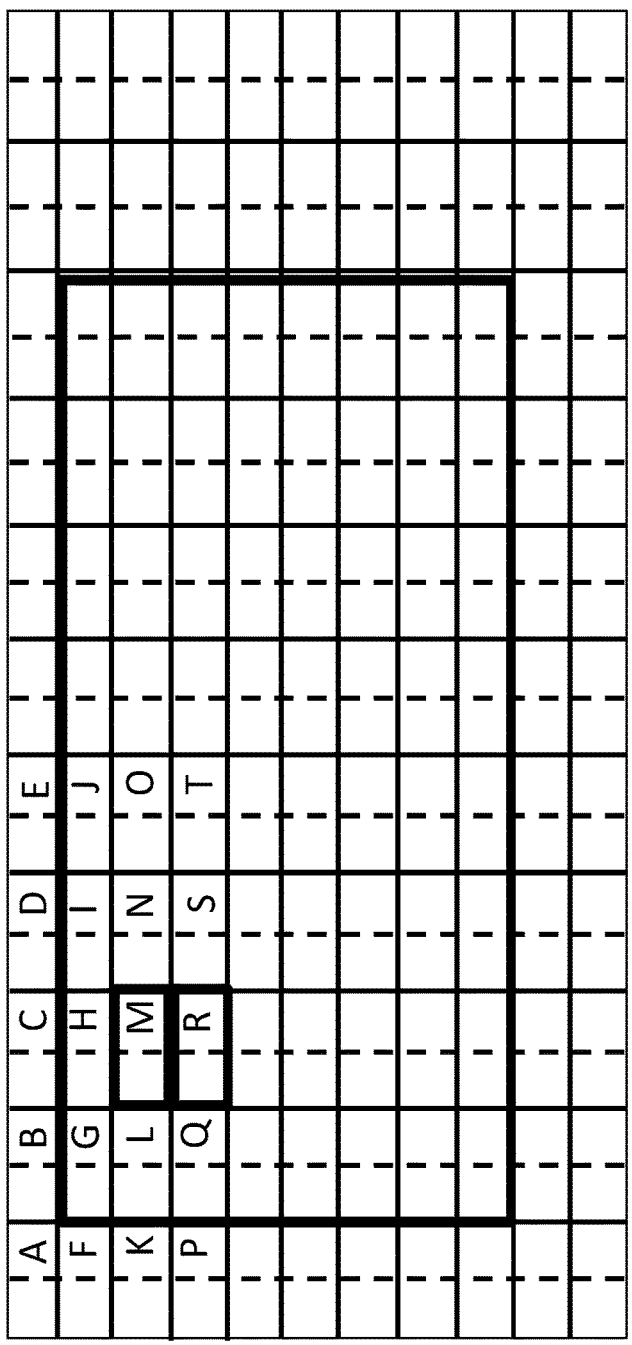
Figure 5K:
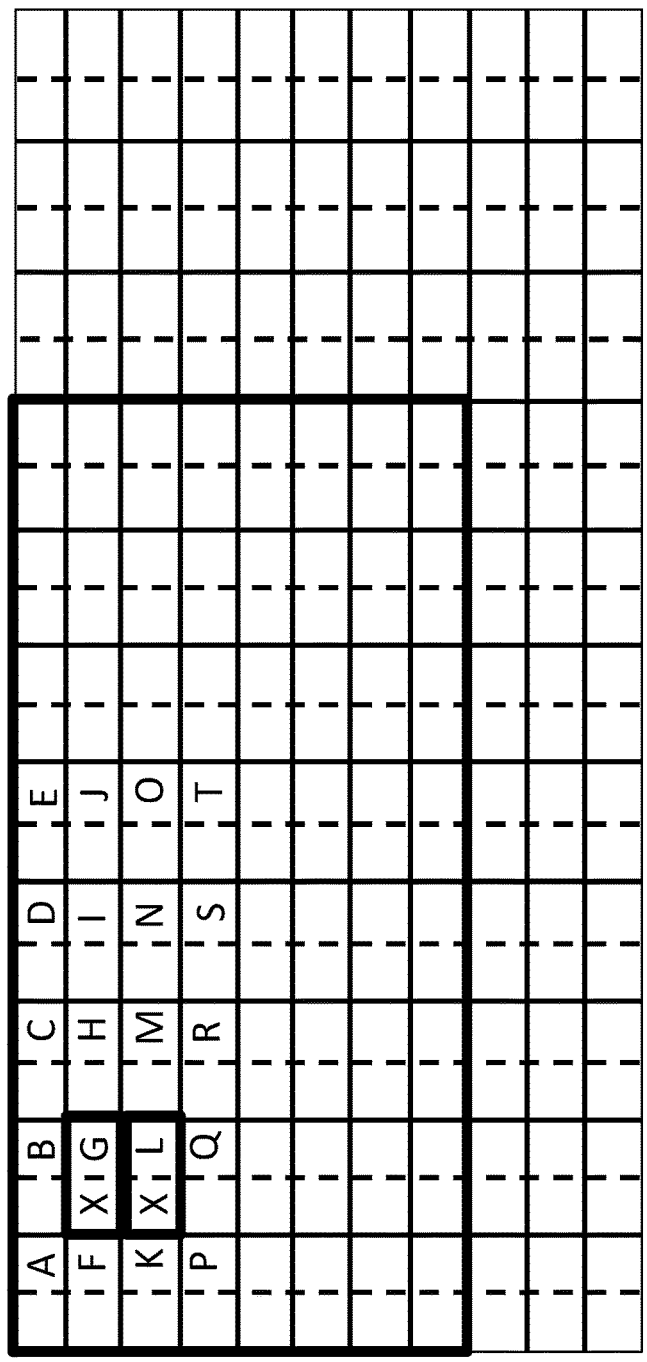

FIG. 5h shows another shift to align each execution lane with its corresponding stencil's lowest row. FIGS. 5i and 5j show continued shifting to complete processing over the course of both execution lanes' stencils. FIG. 5k shows additional shifting to align each execution lane with its correct position in the data array and write the resultant thereto.

In the example of FIGS. 5a-5k note that the object code for the shift operations may include an instruction format that identifies the direction and magnitude of the shift expressed in (X, Y) coordinates. For example, the object code for a shift up by one location may be expressed in object code as SHIFT 0, +1. As another example, a shift to the right by one location may expressed in object code as SHIFT +1, 0. In various embodiments shifts of larger magnitude may also be specified in object code (e.g., SHIFT 0, +2). Here, if the 2D shift register hardware only supports shifts by one location per cycle, the instruction may be interpreted by the machine to require multiple cycle execution, or, the 2D shift register hardware may be designed to support shifts by more than one location per cycle. Embodiments of the later are described in more detail further below.

Figure 6A:
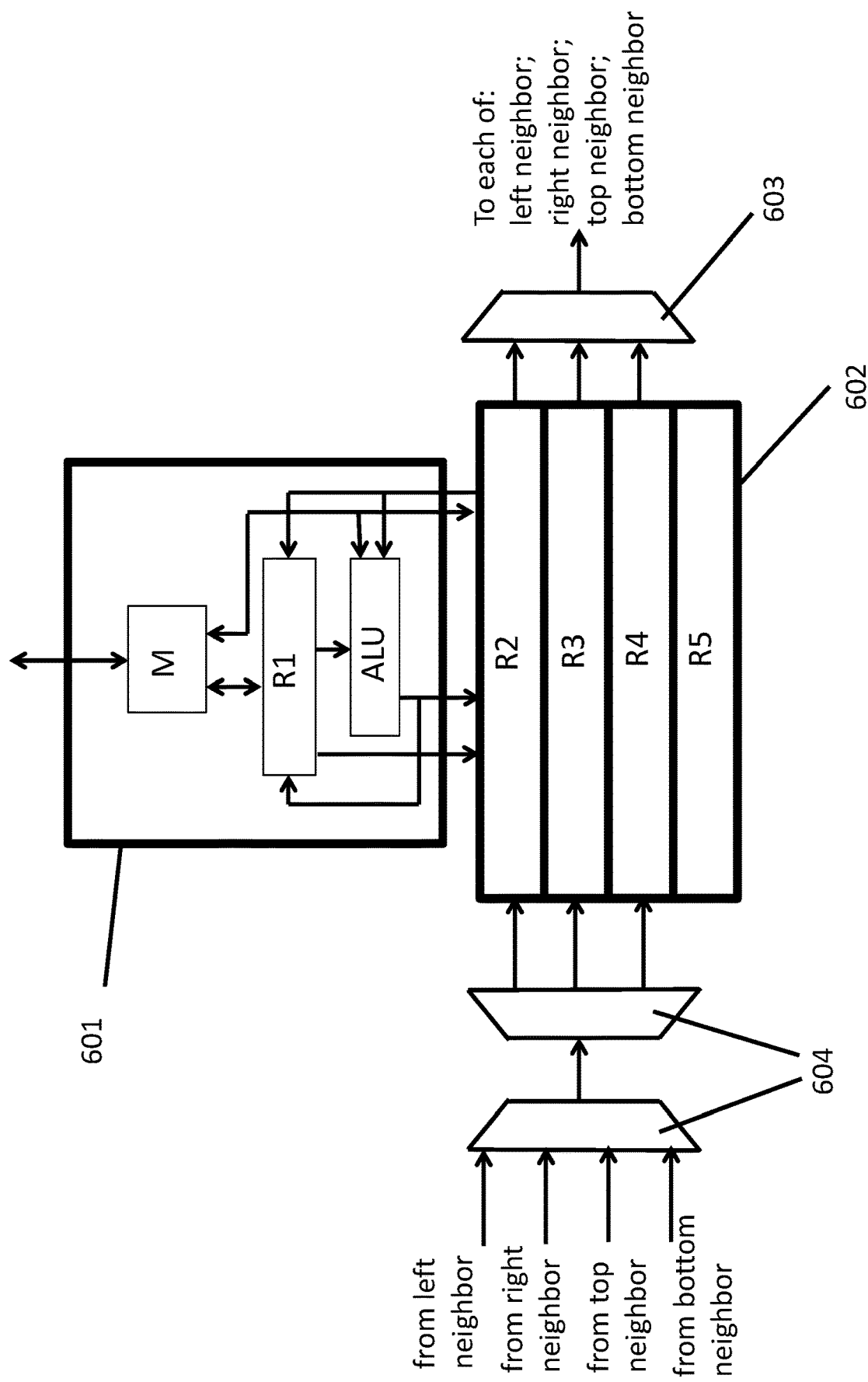
FIG. 6a shows an embodiment of a unit cell for an integrated execution lane array and two-dimensional shift array.

FIG. 6a shows another, more detailed depiction of the unit cell for the array execution lane and shift register structure (registers in the halo region do not include a corresponding execution lane). The execution lane and the register space associated with each location in the execution lane array is, in an embodiment, implemented by instantiating the circuitry observed in FIG. 6a at each node of the execution lane array. As observed in FIG. 6a, the unit cell includes an execution lane 601 coupled to a register file 602 consisting of four registers R2 through R5. During any cycle, the execution lane 601 may read from or write to any of registers R1 through R5. For instructions requiring two input operands the execution lane may retrieve both of operands from any of R1 through R5.

In an embodiment, the two dimensional shift register structure is implemented by permitting, during a single cycle, the contents of any of (only) one of registers R2 through R4 to be shifted "out" to one of its neighbor's register files through output multiplexer 603, and, having the contents of any of (only) one of registers R2 through R4 replaced with content that is shifted "in" from a corresponding one if its neighbors through input multiplexers 604 such that shifts between neighbors are in a same direction (e.g., all execution lanes shift left, all execution lanes shift right, etc.). Although it may be common for a same register to have its contents shifted out and replaced with content that is shifted in on a same cycle, the multiplexer arrangement 603, 604 permits for different shift source and shift target registers within a same register file during a same cycle.

As depicted in FIG. 6a note that during a shift sequence an execution lane will shift content out from its register file 602 to each of its left, right, top and bottom neighbors. In conjunction with the same shift sequence, the execution lane will also shift content into its register file from a particular one of its left, right, top and bottom neighbors. Again, the shift out target and shift in source should be consistent with a same shift direction for all execution lanes (e.g., if the shift out is to the right neighbor, the shift in should be from the left neighbor).

Although in one embodiment the content of only one register is permitted to be shifted per execution lane per cycle, other embodiments may permit the content of more than one register to be shifted in/out. For example, the content of two registers may be shifted out/in during a same cycle if a second instance of the multiplexer circuitry 603, 604 observed in FIG. 6a is incorporated into the design of FIG. 6a. Of course, in embodiments where the content of only one register is permitted to be shifted per cycle, shifts from multiple registers may take place between mathematical operations by consuming more clock cycles for shifts between mathematical operations (e.g., the contents of two registers may be shifted between math ops by consuming two shift ops between the math ops).

If less than all the content of an execution lane's register files are shifted out during a shift sequence note that the content of the non shifted out registers of each execution lane remain in place (do not shift). As such, any non shifted content that is not replaced with shifted in content persists local to the execution lane across the shifting cycle. The memory unit ("M") observed in each execution lane is used to load/store data from/to the random access memory space that is associated with the execution lane's row and/or column within the execution lane array. Here, the M unit acts as a standard M unit in that it is often used to load/store data that cannot be loaded/stored from/to the execution lane's own register space. In various embodiments, the primary operation of the M unit is to write data from a local register into memory, and, read data from memory and write it into a local register.

With respect to the ISA opcodes supported by the ALU unit of the hardware execution lane 601, in various embodiments, the mathematical opcodes supported by the hardware ALU are integrally tied with (e.g., substantially the same as) the mathematical opcodes supported by a virtual execution lane (e.g., ADD, SUB, MOV, MUL, MAD, ABS, DIV, SHL, SHR, MIN/MAX, SEL, AND, OR, XOR, NOT). As described just above, memory access instructions can be executed by the execution lane 601 to fetch/store data from/to their associated random access memory. Additionally the hardware execution lane 601 supports shift op instructions (right, left, up, down) to shift data within the two dimensional shift register structure. As described above, program control instructions are largely executed by the scalar processor of the stencil processor.

Figure 6B:
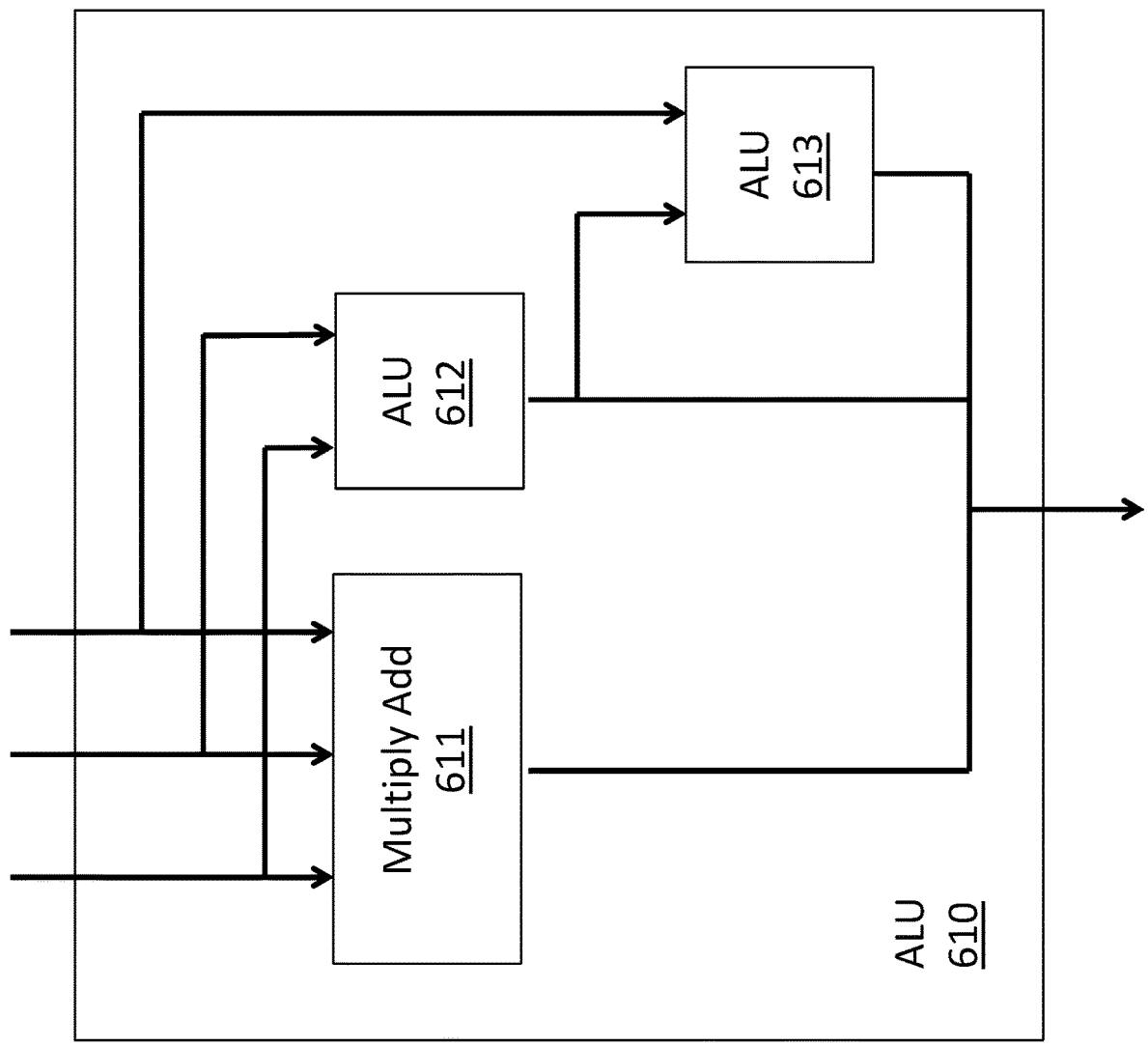
FIG. 6b shows an embodiment of an execution lane ALU.

FIG. 6b shows an embodiment of a processor ALU. As observed in FIG. 6b, the processor ALU includes a multiply-add unit 611 and first and second nominal ALUs 612, 613. The multiply-add unit 611 performs the operation (A*B)+C. The first and second nominal ALUs perform nominal math and logical operations including comparison operations (e.g., add, subtract, and, or, xor, comparison, minimum, maximum, absolute value, shift). The ALU design can be viewed as having two primary datapaths: a first that includes the multiply-add unit 611, a second that includes a dual ALU 612, 613 chain. The dual ALU chain 612, 613 permits for more complex instructions having two operations in a single instruction (e.g., two ADDs in a single instruction; and ADD and a divide (DIV) in a single instruction; a subtract (SUB) and an absolute value (ABS) in a single instruction, etc.). Input operands are receivable from registers. Various embodiments may include the use of immediate operands that are appended to the opcode. The output resultant is written to a register.

c. 2D Shift Register Embodiments

Figure 7A:
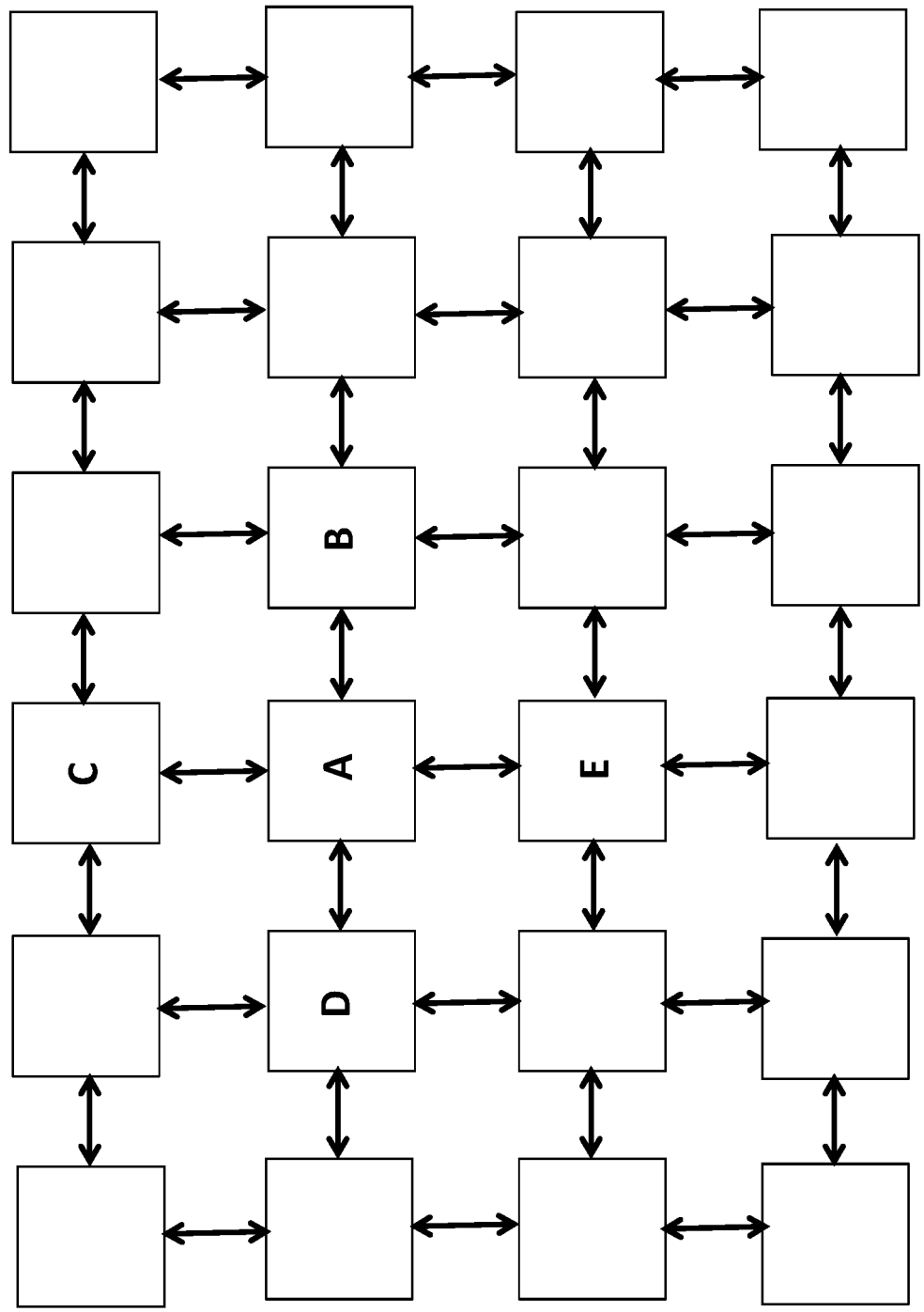
FIG. 7a depicts a first two dimensional register array structure interconnection scheme.

FIG. 7a depicts an embodiment of a "top down" view of the logical (and potentially physical) design of a two-dimensional register array structure. The "top-down" view of FIG. 7a essentially conforms to the unit cell design embodiment of FIG. 6 in which each register file at a particular array location is coupled to the register file of its left, right, up and down neighboring unit cell location. That is, for example, as seen in FIG. 7a, register file A is coupled to register files B, C, D and E.

Figure 7B:
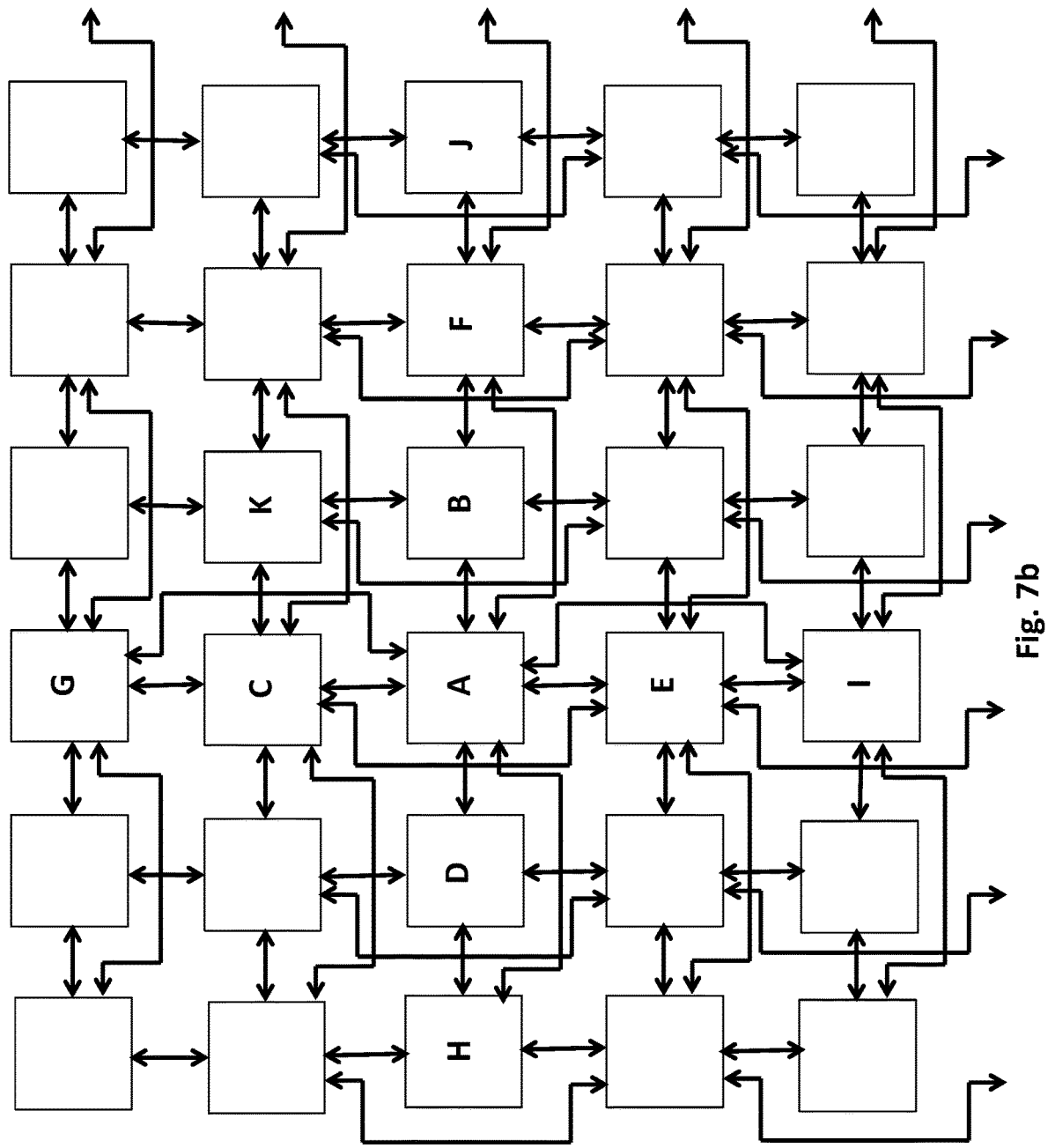
FIG. 7b depicts a second two dimensional register array structure interconnection scheme.

FIG. 7b depicts another embodiment of a "top-down" view of the logical (and potentially physical) design of a two-dimensional register array structure. As observed in FIG. 7b, unit cells are not only coupled to nearest vertical and horizontal neighbors, but also "second" nearest vertical and horizontal neighbors. For example, as observed in FIG. 7b, unit cell A is not only coupled to unit cells B, C, D and E but is also coupled to unit cells F, G, H and I. For ease of drawing and viewing, only unit cell A is depicted as having the full set of connections needed to have both nearest and second nearest neighbor coupling. Other than unit cell A, only every other unit cell shows second nearest neighbor coupling along any particular row or column (e.g., unit cell B does not depict any second nearest neighbor coupling). The reader will understand that a preferred embodiment would include the coupling of unit cell A for, e.g., all the unit cells within the core and sufficiently away from array edges to support second nearest neighbor coupling.

Having second nearest connection provides for faster propagation of the register values through the register array. For example, if a register value needs to be moved to a unit cell four locations away, the array structure of FIG. 7b can accomplish the move in two cycles whereas the array structure of FIG. 7b can accomplish the same move in only four cycles. Note that the embodiment of FIG. 7b also has nearest neighbor connections. Thus, the processor instruction set for the structure of FIG. 7b may be more expansive than the processor instruction set for the structure of FIG. 7a (the former having one-hop and two-hop MOV instructions whereas the latter only has one-hop MOV instructions).

It is pertinent to point out that the number and combination of different numbered hop movements and corresponding array structure embodiments may widely vary from embodiment to embodiment depending on the appropriate trade off balance between the need for rapid register value movement and the tolerance for array structure wiring density. Some embodiments may support nearest third or and/or fourth neighbor connections, others may not (in the case of nearest fourth neighbor connections, e.g., unit cell D would be directly coupled to unit cell J in FIG. 7b). Some embodiments may have only nearest neighbor connections and nearest third or farther connections, etc. Conceivably, more elaborate embodiments may even support diagonal connections (e.g., connecting unit cell A with unit cell K and its other three neighboring corner unit cells in FIG. 7b). Those of ordinary skill will recognize that any of the various, expanded connections amongst unit cells is readily accomplished by expanding the sources of the inputs to the input mux structure 604 and expanding the fan-out from the output mux structure 603 of FIG. 6a.

Figure 8A:
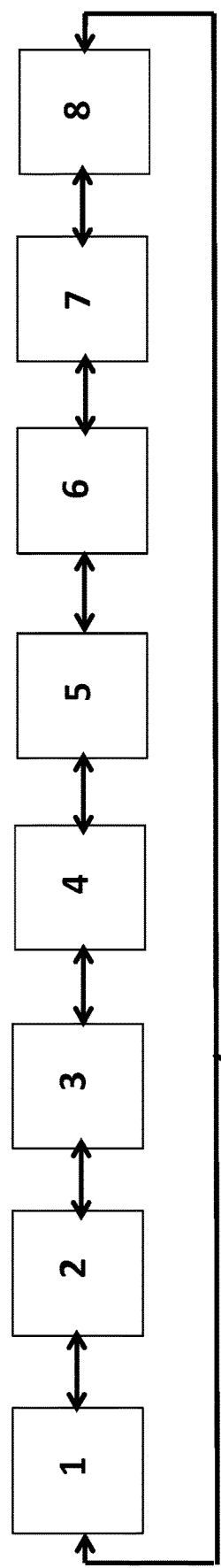
FIG. 8a depicts a first row or column of a two-dimensional register array structure.

FIG. 8a shows an exemplary logical arrangement of registers along a row or column within a two dimensional register array structure (for ease of drawing the register array only has dimensions of 8×8, whereas, in actual practice the dimensions may be much larger). Here, neighboring pixels in an array being processed will be located in numerically neighboring units cells (e.g., a pair of neighboring pixels in the array will be placed in unit cells 3 and 4 rather than 3 and 5). The logical design of FIG. 8a also includes a roll capability by coupling the first logical unit cell 1 to the last unit cell 8 through connection 801 (thus the processors of the execution lane may also include a roll opcode).

Problems may arise however, particularly in the case of arrays of large dimension, if the design of FIG. 8a not only represents the logical design but also represents the physical design. If the approach of FIG. 8a also represents the physical design, connection 801 corresponds to an extremely long length wire as compared to the length of the other wires that connect unit cell pairs other than pair 1 and 8. This particular wire length outlier can impact circuit timing complications (by slowing down all shift times between all unit cells to be no less than the slowest 1<->8 shift time, or, introducing complications that recognize more cycles between 1<->8 shifts than shifts between any other neighboring unit cells).

Figure 8B:
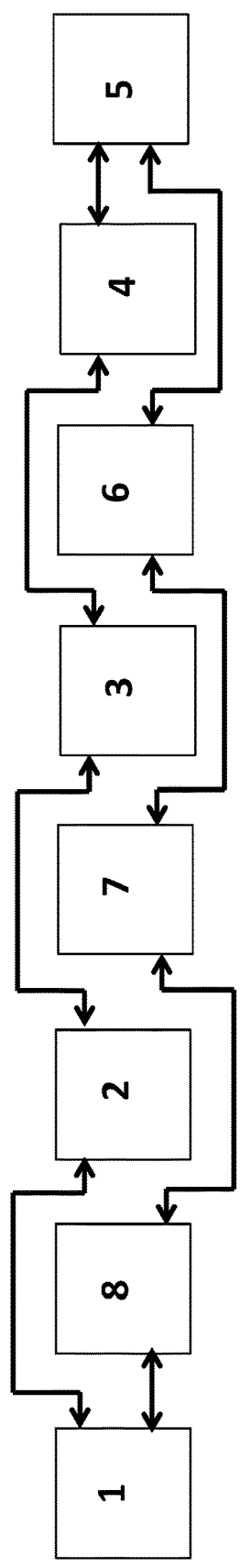
FIG. 8b depicts a second row or column of a two-dimensional register array structure.

FIG. 8b shows an embodiment of an improved physical design for a row or column of a register array structure having the logical design of FIG. 8a. Here, a physical design corresponds to actual layout of circuit structures as opposed to just logical connections (as with a logical design). As observed in FIG. 8b, the physical design amortizes the extra length required by the 1<->8 connection amongst the other unit cell by imposing a toroid design in the logic of the layout. For example, although unit cell 1 is physically connected to unit cell 2 to preserve the logic design, unit cell 8 physically sits between them. The resultant is a maximum wire length between unit cells in the structure of FIG. 8b that is much shorter than the length of wire 801 in FIG. 8a. As such the timing complications of the structure of FIG. 8b avoid the timing complications of the structure of FIG. 8a mentioned above. In an embodiment, a roll of register content between all unit cells can transpire within a single cycle.

Figure 8C:
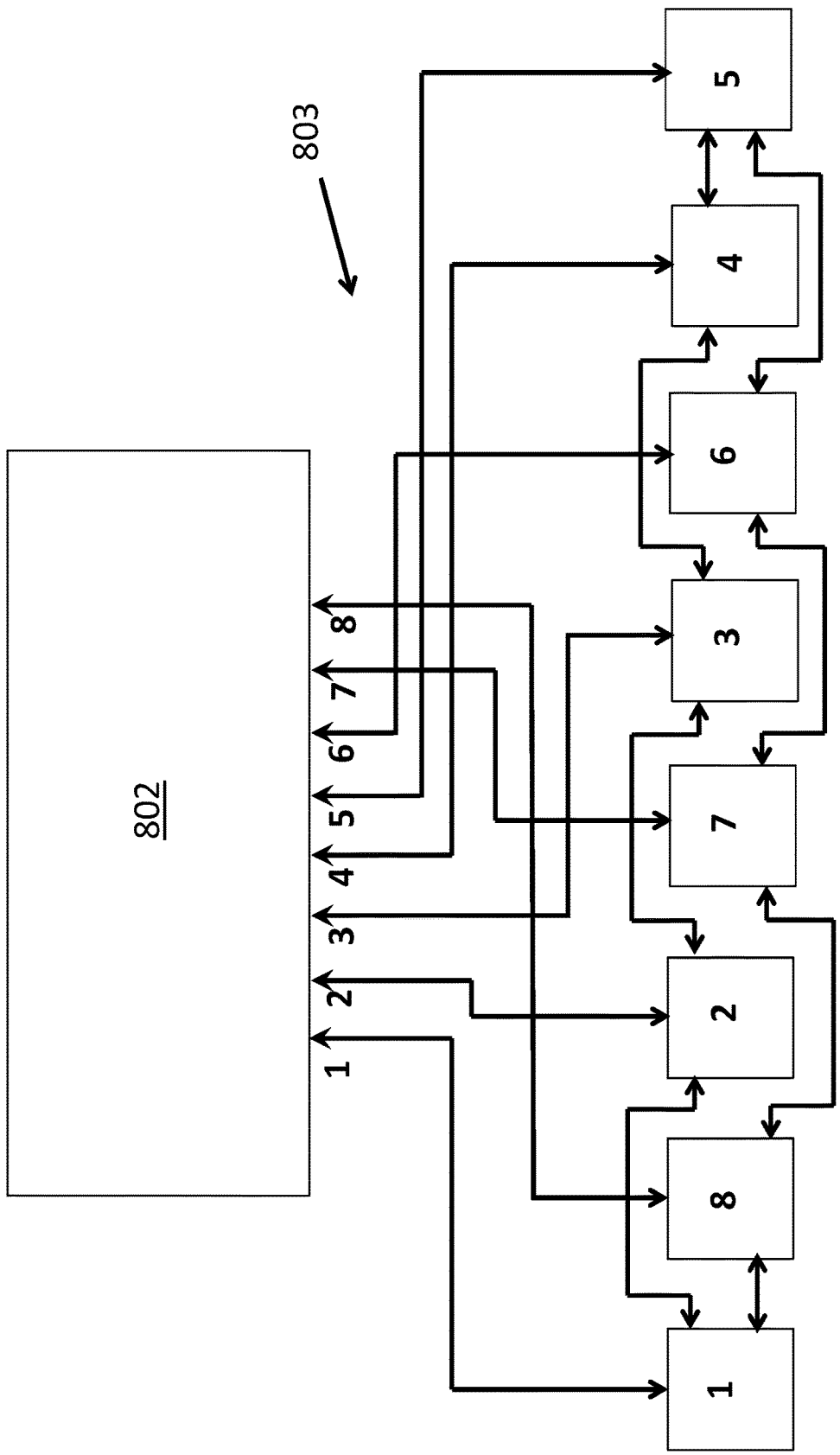
FIG. 8c depicts the row of FIG. 8b coupled to a memory unit.
Figure 8D:
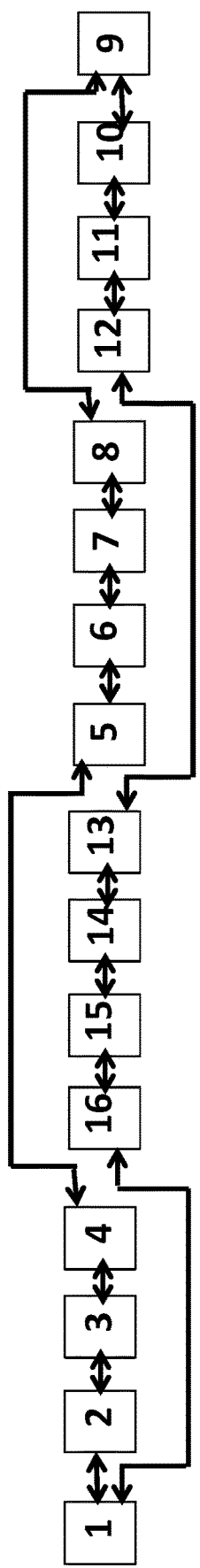
FIG. 8d shows another toroid embodiment.

FIG. 8c shows that the data bus structure between the sheet generator or a random access memory 802 (such as any of RAMs 407 of FIG. 4) and a row or column of the register array include a kind of swizzling structure 803 in order to preserve the correct logic connections to an array or row having a toroid physical layout. FIG. 8d shows another toroid structure that can implement 4-hop shifts where the maximum distance traveled by any register value is 4 unit cells. Here, it should be clear that another swizzling like data bus would exist between the registers of FIG. 8d and the sheet generator or RAM. As such, a feature of the implementation of a toroid physical layout is the existence of swizzling by a data bus that connects inputs that are arranged in logical order.

Figure 8E:
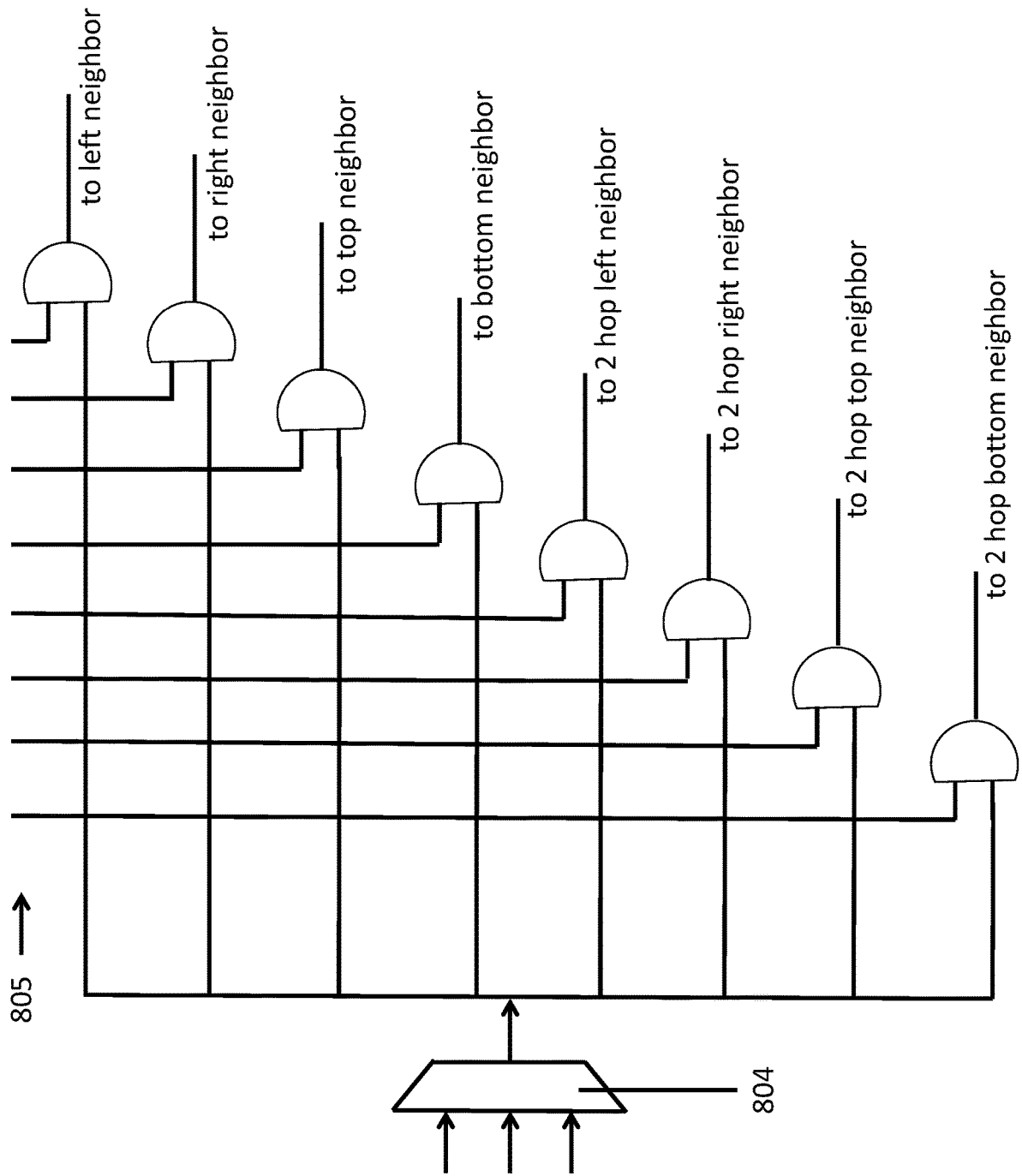
FIG. 8e shows a power conservation circuit.

FIG. 8e shows special fan-out circuitry from the output multiplexer 804 of a unit cell of the shift array structure. Here, output multiplexer 804 can be viewed as akin to output multiplexer 603 of FIG. 6a. As the shift array is designed to support more and more connections (one hop, two hop, etc.), the fan-out of the output multiplexer 804 grows. As the fan-out of the multiplexer 804 grows, power consumption may become more and more of an issue. FIG. 8e shows an output multiplexer 804 for a shift register array that fully supports both one hop and two connections. Here, without the presence of the logic gates observed in FIG. 8e, a new output at multiplexer 804 (e.g., a new shift out value) would be broadcast to eight different locations (left neighbor, right neighbor, . . . , 2 hop bottom neighbor). Here, as is understood in the art, a change in data across a run length of wire in a logical circuit corresponds to "switching activity" which, in turn, consumes power.

The presence of the eight logic gates observed at the output of multiplexer 804 are designed to prevent any such data change except on the actual wire that corresponds to the shift direction. For example, if the shift direction is one-hop to the right, only the gate that is coupled to the immediate right neighbor will permit the output of the multiplexer 804 to pass. All other logic gates will prevent the data value from propagating to the other nodes (where the shift value is not needed) and reduce power consumption of the shift operation in the process.

d. Additional Execution Lane Operations of Note

FIG. 9 pertains to a technique used to permit the execution lane s within the execution lane array to handle different data bit widths. Here, as is understood in the art, greater dynamic range is achieved by increasing the bit width of the data values (a 16 bit value can express values with greater dynamic range than an 8 bit value can). In an embodiment, the stencil processors are expected to operate on images having different bit widths such as 8, 16 or 32 bit pixel values. As such, according to one approach, the execution lane s themselves are 32 bit machines in the sense that the execution lane s internally can handle 32 bit operands.

However, to decrease the size and complexity of the two dimensional shift register, the individual storage elements of the registers within each execution lane's register file are limited to 8 bits. In the case of 8 bit image data there is no issue because an entire sheet of data can fit in one register of the register file. By contrast, in the case of 16 or 32 bit operands, the sheet generator generates multiple sheets to appropriately express the input operand data set.

For example, as depicted in FIG. 9 in the case of 16 bit input operands the sheet generator will generate a HI half sheet and a LO half sheet. The HI half sheet contains the upper 8 bits of each data item at the correct array location. The LO half sheet contains the lower 8 bits of each data item at the correct array location. 16 bit operations are then performed by loading both sheets into the stencil processor and informing the execution lane hardware (e.g., via an immediate value in the program code) that 16 bit operation is to take place. Here, as just one possible mode of operation, both the HI and LO sheets are loaded in two different registers of each execution lane's register file.

The execution lane units are able to internally construct the correct operands by first reading from one of the register file locations and appending the data therein with the data read from another of the register file locations. Similarly, in the write direction, the execution lane units will have to perform two writes. Specifically, a first write of the lower 8 bits to a first register of the register file containing the LO sheet and then a second write of the upper 8 bits to a second register of the register file containing the HI sheet.

Recall from previous discussions that in various embodiment shifts from the content of only one register is permitted to be shifted per cycle. In these cases, in order to move 16 bit data values around the two dimensional shift register structure, two cycles are consumed per shift sequence (between math ops) rather than one cycle in the case of 8 bit data values. That is, in the nominal case of 8 bit data values, all data can be shifted between locations in a single cycle. By contrast in the case of 16 bit data values, two 8 bit values have to be shifted per shift register shift operation (the HI half sheet and the LO half sheet). In an embodiment, in the case of 32 bits, the same principles apply except that four sheets are created to represent the entire image data rather than two sheets. Likewise, as many as four cycles may need to be consumed per shift sequence. Note that the discussion of 8 bit register widths is only exemplary. Generally any bit width is possible (e.g., 16 bit wide registers within the register file with 32 bit wide circuitry internal to the execution lane).

FIG. 10 pertains to a compiler operation which unrolls random memory accesses so there are no competing memory accesses within the actual hardware during operation. Here, the procedure of FIG. 10 is directed to the structuring of object code in view of the data being operated on by higher level virtual code and the physical limitations of the underlying machine. As discussed previously, each execution lane in the execution lane array has an associated register file (e.g., four registers per execution lane). Like most execution lanes, the execution lane reads and/or writes data from/to the registers consistent with the object code instructions. The compiler, like most compilers, is conscious of what data resides in what register and recognizes the physical limitations of the available register space.

As such, from time to time an execution lane may need a data item that is not in register space but is instead located in a random access memory that is associated with an execution lane's row and/or column in the execution lane array. Likewise, from time to time an execution lane may need to write a data item but there is no register space into which the data can be written (because all data currently within register space still has dependencies). In these circumstances the compiler will insert memory load or memory store instructions into the object code (as opposed to register load or register store instructions) to fetch/write data from/to random access memory rather than register space.

FIG. 10 depicts an embodiment of the hardware architecture showing a separate random access memory 1007_1 through 1007_R along each row of the array. From this architecture, execution lane s along a same row of the execution lane array are given access to a same random access memory. As drawn, each execution lane includes a memory unit for accessing its respective random access memory. Accordingly, when two different execution lane s on different rows execute a memory load instruction during a same cycle the instructions are not competing because they are directed to different random access memories.

By contrast if execution lane s on a same row are to perform a memory access on a same cycle the memory access will compete. Given that the execution lane array is intended to operate in a SIMD like fashion, the program code will naturally cause execution lane s in the array (which includes both rows and columns) to issue memory access requests on a same cycle. Thus, competing memory access from execution lane s on a same row is a foreseeable hazard. FIG. 10 shows a pair of threads 1001 for execution on two different execution lane s on a same row. Given the SIMD-like nature of the machine both execution lane s execute same opcodes in same cycles including a pair of memory load instructions in the first two depicted cycles. Examining the addresses of the memory load instructions, note that all the addresses are different. Thus, the first memory load instruction of both threads truly compete with one another and the second memory load instruction of both threads truly compete with one another.

As such, when the compiler imposes a memory load instruction into the object code it also recognizes that memory load instructions will impose conflicts for execution lane s that reside on a same row. In response, the compiler will impose sequential memory load instructions into the code to effectively unroll the competing memory load instruction along a same row so that each execution lane is provided with its own reserved cycle for accessing the memory. In the example of FIG. 10, note that the final object code 1002 includes a sequence of four sequential memory load instructions across four cycles to ensure that the memory access of one execution lane does not interfere with the memory access of another execution lane along the same row.

Note that the approach of FIG. 10 is particularly applicable to the look-up table portion of the memory model discussed above in Section 1.0. Here, recall that different execution lane s may use different indexes in a same look up table to access different entries of a same look up table in a same cycle. In an embodiment, the compiler will instantiate a different copy of the same look up table into each random access memory 1007_1 through 1007_R. Lookups may therefore be made into the local table copy during a same cycle by execution lane s on different rows. Such look-ups do not compete and the index of each look-up may be different. By contrast, look-ups performed by execution lane s along a same row will access the same look-up table in the same memory and will need be unrolled and performed sequentially. With the unrolling into sequential access the index values are permitted to be different. In an embodiment the VLIW instruction format of the object code includes, along with an opcode for a mathematical operation, an opcode for a memory operation that further includes the identity of the execution lane along a row that is actually supposed to execute the instruction (the other execution lane s along the row treat it as a no-op).

In various embodiments the compiler treats atomic update instructions similarly to look-up tables. That is, memory space is reserved (e.g., per row) in random access memories 1007_1 through 1007_R for atomic instruction resultants. Non competing updates (e.g., from a same positioned execution lane along different rows) are permitted to execute during a same cycle whereas competing updates (e.g., by execution lane s along a same row) are unrolled into separate instructions. Atomic update instructions are often implemented by the compiler as read-modify-write instructions where a read is made of recent resultant data residing in an execution lane's register space, such data is operated on mathematically and then written into the specially reserved atomic updates table.

e. Implementation Embodiments

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the later, such circuit descriptions may take of the form of higher/behavioral level circuit descriptions (e.g., a VHDL description) or lower level circuit description (e.g., a register transfer level (RTL) description, transistor level description or mask description) or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

FIG. 11 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two.

As observed in FIG. 11, the basic computing system may include a central processing unit 1101 (which may include, e.g., a plurality of general purpose processing cores 1115_1 through 1115_N and a main memory controller 1117 disposed on a multi-core processor or applications processor), system memory 1102, a display 1103 (e.g., touchscreen, flat-panel), a local wired point-to-point link (e.g., USB) interface 1104, various network I/O functions 1105 (such as an Ethernet interface and/or cellular modem subsystem), a wireless local area network (e.g., WiFi) interface 1106, a wireless point-to-point link (e.g., Bluetooth) interface 1107 and a Global Positioning System interface 1108, various sensors 1109_1 through 1109_N, one or more cameras 1110, a battery 1111, a power management control unit 1112, a speaker and microphone 1113 and an audio coder/decoder 1114.

An applications processor or multi-core processor 1150 may include one or more general purpose processing cores 1115 within its CPU 1101, one or more graphical processing units 1116, a memory management function 1117 (e.g., a memory controller), an I/O control function 1118 and an image processing unit 1119. The general purpose processing cores 1115 typically execute the operating system and application software of the computing system. The graphics processing units 1116 typically execute graphics intensive functions to, e.g., generate graphics information that is presented on the display 1103. The memory control function 1117 interfaces with the system memory 1102 to write/read data to/from system memory 1102. The power management control unit 1112 generally controls the power consumption of the system 1100.

The image processing unit 1119 may be implemented according to any of the image processing unit embodiments described at length above in the preceding sections. Alternatively or in combination, the IPU 1119 may be coupled to either or both of the GPU 1116 and CPU 1101 as a co-processor thereof. Additionally, in various embodiments, the GPU 1116 may be implemented with any of the image processor features described at length above.

Each of the touchscreen display 1103, the communication interfaces 1104-1107, the GPS interface 1108, the sensors 1109, the camera 1110, and the speaker/microphone codec 1113, 1114 all can be viewed as various forms of I/O (input and/or output) relative to the overall computing system including, where appropriate, an integrated peripheral device as well (e.g., the one or more cameras 1110). Depending on implementation, various ones of these I/O components may be integrated on the applications processor/multi-core processor 1150 or may be located off the die or outside the package of the applications processor/multi-core processor 1150.

In an embodiment one or more cameras 1110 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A system comprising:
one or more computers and one or more storage devices storing instructions that are operable, when executed by the one or more computers, to cause the one or more computers to perform operations comprising:
receiving an input program to be executed on a device comprising:
a plurality of random access memories, and
a plurality of execution lanes, wherein different groups of the execution lanes are assigned to use a different respective random access memory of the plurality of random access memories;
determining that the input program specifies two or more execution lanes in a same group of the plurality of execution lanes to compete for different memory locations in a same random access memory of the plurality of random access memories; and
in response, modifying the input program to generate multiple instructions that cause execution lanes within each group to access a respective random access memory sequentially.

2. The system of claim 1, wherein the plurality of execution lanes includes a plurality of rows of execution lanes, wherein the different groups of the execution lanes comprise different rows of the execution lanes.

3. The system of claim 1, wherein the plurality of execution lanes includes a plurality of columns of execution lanes, wherein the different groups of the execution lanes comprise different columns of the execution lanes.

4. The system of claim 1, wherein the plurality of execution lanes are arranged in an array of execution lanes.

5. The system of claim 4, wherein the plurality of execution lanes are coupled to a two dimensional shift register array structure, wherein the execution lanes are located at respective array locations and are coupled to dedicated registers at same respective array locations in the two-dimensional shift register array structure.

6. The system of claim 5, wherein the plurality of random access memories are to store register values that spill out of the two dimensional shift register array structure.

7. The system of claim 1, wherein the plurality of random access memories are to store look-up table information.

8. The system of claim 1, wherein each of the multiple instructions cause the execution lanes to read data from the respective random access memory or to write data to the respective random access memory.

9. The system of claim 1, wherein each execution lane of the plurality of execution lanes comprises a memory unit configured to write data from local register space into random access memory and to write data from random access memory into local register space.

10. The system of claim 1, wherein the plurality of execution lanes is coupled to a scalar processor to receive and execute the input program in SIMD fashion.

11. The system of claim 1, wherein the input program is contained in a larger data structure having a VLIW format.

12. A method comprising:
receiving an input program to be executed on a device comprising:
a plurality of random access memories, and
a plurality of execution lanes, wherein different groups of the execution lanes are assigned to use a different respective random access memory of the plurality of random access memories;
determining that the input program specifies two or more execution lanes in a same group of the plurality of execution lanes to compete for different memory locations in a same random access memory of the plurality of random access memories; and
in response, modifying the input program to generate multiple instructions that cause execution lanes within each group to access a respective random access memory sequentially.

13. The method of claim 12, wherein the plurality of execution lanes includes a plurality of rows of execution lanes, wherein the different groups of the execution lanes comprise different rows of the execution lanes.

14. The method of claim 12, wherein the plurality of execution lanes includes a plurality of columns of execution lanes, wherein the different groups of the execution lanes comprise different columns of the execution lanes.

15. The method of claim 12, wherein the plurality of execution lanes are arranged in an array of execution lanes.

16. The method of claim 15, wherein the plurality of execution lanes are coupled to a two dimensional shift register array structure, wherein the execution lanes are located at respective array locations and are coupled to dedicated registers at same respective array locations in the two-dimensional shift register array structure.

17. The method of claim 16, wherein the plurality of random access memories are to store register values that spill out of the two dimensional shift register array structure.

18. The method of claim 12, wherein the plurality of random access memories are to store look-up table information.

19. The method of claim 12, wherein each of the multiple instructions cause the execution lanes to read data from the respective random access memory or to write data to the respective random access memory.

20. The method of claim 12, wherein each execution lane of the plurality of execution lanes comprises a memory unit configured to write data from local register space into random access memory and to write data from random access memory into local register space.

\* \* \* \* \*